United States Patent [19]

Meeker

[11] Patent Number: 5,313,298
[45] Date of Patent: May 17, 1994

[54] VIDEO COMPANDING METHOD AND SYSTEM

[75] Inventor: G. William Meeker, Silver Spring, Md.

[73] Assignee: Rubin, Bednarek and Associates, Inc., Washington, D.C.

[21] Appl. No.: 846,681

[22] Filed: Mar. 5, 1992

[51] Int. Cl.$^5$ .................. H04N 7/133; H04N 7/137
[52] U.S. Cl. .................. 348/384; 348/405; 348/416; 348/417; 348/613
[58] Field of Search .............. 358/166, 167, 133, 136

[56] References Cited

U.S. PATENT DOCUMENTS

| | | |
|---|---|---|
| 3,674,398 | 7/1972 | Baumgartner et al. |
| 4,009,334 | 2/1977 | Sypula. |
| 4,302,768 | 11/1981 | Kamura et al. |
| 4,573,075 | 2/1986 | Bolger. |
| 4,602,278 | 7/1986 | Pritchard et al. |
| 4,661,862 | 4/1987 | Thompson. |
| 4,745,473 | 5/1988 | Hall. |
| 4,774,574 | 9/1988 | Daly et al. |
| 4,987,480 | 1/1991 | Lippman et al. |
| 5,021,891 | 6/1991 | Lee. |

OTHER PUBLICATIONS

"Visual Phenomena", Jae S. Lim, *Two-Dimensional Signal and Image Processing*, 1990, pp. 429–435.
"Instantaneous Companding", Lawrence R. Rabiner & Ronald W. Schafer, *Digital Processing of Speech Signals*, 1978, pp. 186–195.
"Video Codec CCITT Recommendation", pp. 79–107.

*Primary Examiner*—Tommy Chin
*Assistant Examiner*—Richard Lee
*Attorney, Agent, or Firm*—Kerkam, Stowell, Kondracki & Clarke

[57] ABSTRACT

A companding technique takes advantage of spatial masking in order to avoid problems from noise and/or distortion introduced when storing or transmitting video signals. A forward companding or encoding part of the technique divides a video frame into separate portions. A local average is calculated for each portion. For each pixel or picture element within a portion, the average of that portion is subtracted and the result is subjected to a non-linear forward process which emphasizes those video signals which are close to the local average and which de-emphasizes those video signal portions which are relatively different from the local average. An encoded output is applied to a medium and, upon recovery from the medium, the recovered signal is subjected to a decode process including a non-linear reconstruction process which is the inverse of the non-linear process applied at the encode stage. The compand process may be used in combination with known video data compression techniques such as transform and quantization techniques, predictive coding, and vector quantization. It may also be used with known image motion compensation techniques.

29 Claims, 8 Drawing Sheets

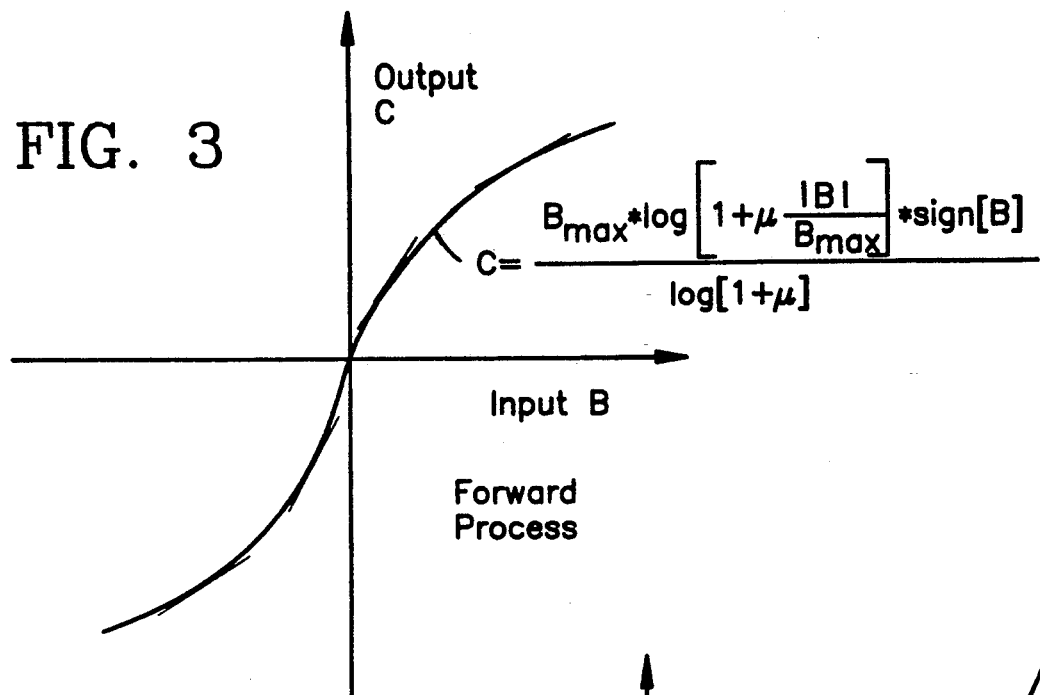
FIG. 3 — Forward Process
$$C = \frac{B_{max} * \log\left[1 + \mu \frac{|B|}{B_{max}}\right] * \text{sign}[B]}{\log[1+\mu]}$$
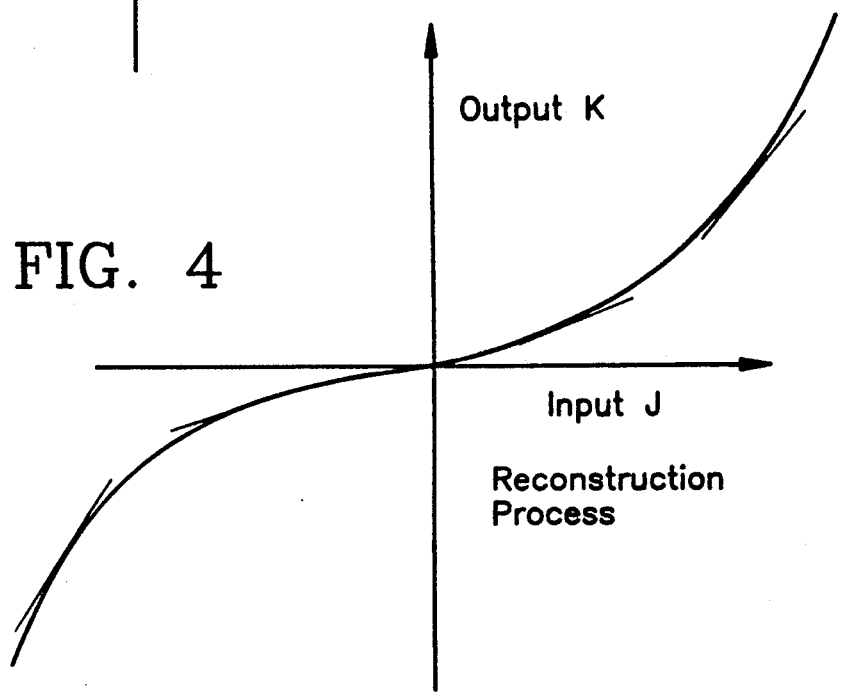
FIG. 4 — Reconstruction Process
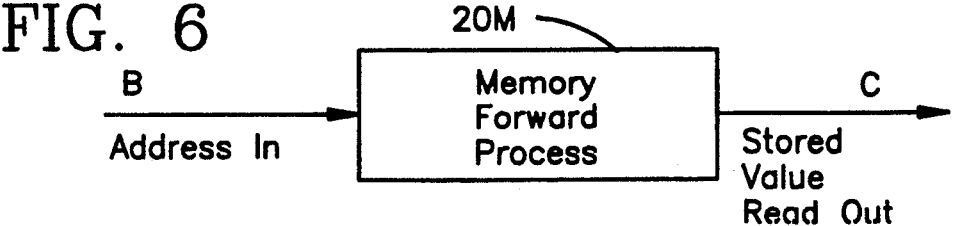
FIG. 6

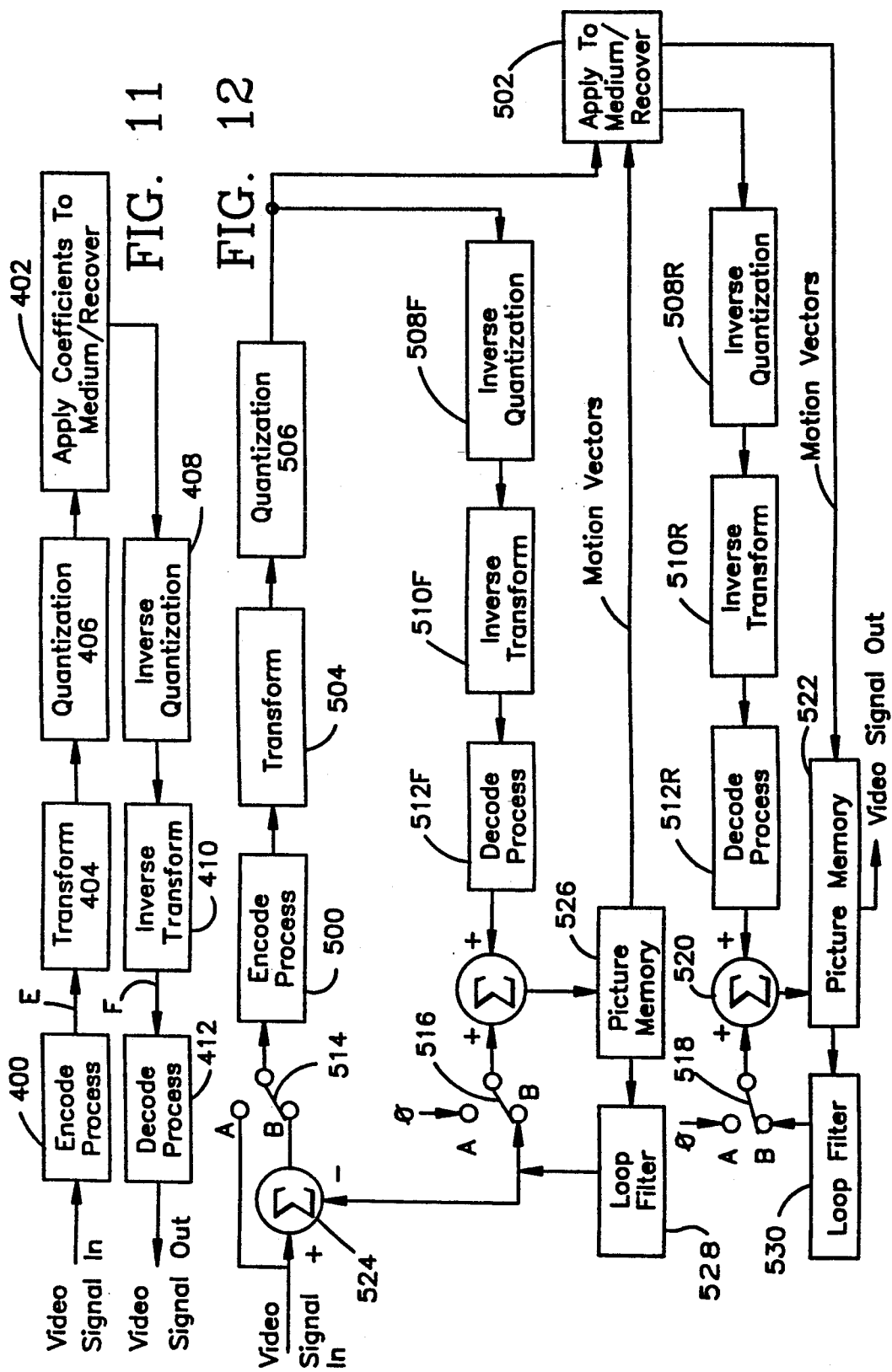

VIDEO COMPANDING METHOD AND SYSTEM

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention relates to the non-linear compression and expanding of video signals to better facilitate application of video information to a medium, which medium may be a storage medium or a transmission medium. The invention also relates to compression and expanding of video signals to minimize distortion effects introduced by bandwidth compression devices designed to minimize data to be transmitted or stored in memory.

When video signals or other signals are applied to a transmission or storage system, the transmission or storage system has the undesirable effect of introducing noise into the signal. In a transmission system or medium, the signal which is received is a combination of the transmitted signal and noise introduced by the process. In somewhat similar fashion, the signal which is recovered from a storage system is a combination of the signal which was applied to the storage system and noise introduced by the process. Various techniques for minimizing the effects of such noise have been used for the storage and/or transmission of different types of signals. Generally, such techniques try to maintain the signal-to-noise ratio (SNR) at a sufficiently high level that noise will not be noticeable.

One common technique to minimize noise problems from transmission or storage is frequency domain signal pre-emphasis applied to a signal prior to its transmission or storage. This technique, which is relatively common for audio signals and has also been used for video signals, takes advantage of the fact that the troublesome noise is usually at high frequencies. The pre-emphasis is an entirely linear method which may be accomplished purely with linear filter operations. The technique relies on the fact that the video signal contains lower amplitude high frequency components than the amplitude of the lower frequency components. The signal is first passed through a filter whose transmission generally increases with an increase in frequency and the output of the filter is then subjected to the transmission or storage. Thus, the higher frequencies of the signal (audio, video, or other) are transmitted or stored at a higher amplitude than would be without the pre-emphasis. After recovery of the signal from transmission or storage, the recovered signal is passed through a de-emphasis linear filter which has the opposite amplitude and phase characteristic from the pre-emphasis linear filter. That is, the result of both filters in tandem is an amplitude response uniform in amplitude and a linear phase-with-frequency characteristic meaning that all frequency components have equal time delay. The de-emphasis filter has the effect of reducing the high frequency noise which was added by the transmission or storage process since the high frequencies of both signal and noise are attenuated to return the signal to its former frequency-amplitude characteristic.

The frequency domain pre-emphasis technique is widely used in audio and video systems, but has several limitations. The amount of pre-emphasis which can be used is usually limited by the increase in signal amplitude which can be tolerated by the transmission or storage system without clipping the signal at its furthest positive and negative signal values. In other words, extreme pre-emphasis would boost the high frequency signal components to such a magnitude that the transmission or storage system could not properly handle them. When the pre-emphasis technique is used for satellite video transmission systems, the amount of pre-emphasis is also limited by the amount of interference introduced into neighboring satellite communication systems.

Another analog technique which has been used is a method called coring. Unlike the frequency pre-emphasis technique, the coring technique does not pre-condition the signal prior to transmission or storage. Moreover, coring is not a linear technique. Coring is based on the principle that the noise added by a transmission or storage system is predominantly high frequency noise of low amplitude relative to the signal itself. Various types of coring techniques may be used, but the general principles will be described. Linear filtering to isolate the high and low frequency signal portions is applied to a signal which is recovered from storage or transmission. Next, a non-linear operation is applied to the separated high frequency signal. This non-linear operation highly attenuates the signal when the signal amplitude is very close to the average value of the high frequency signal, while passing the signal with a linear amplitude characteristic when the high frequency signal departs more than a pre-determined amount from its average value. The resulting modified high frequency signal is then recombined with the low frequency component of the video signal to result in a signal with low amplitude, high frequency components removed. Unfortunately, this coring technique removes high frequency low amplitude signal components in addition to the noise components.

A technique of audio companding (from compress and expand) has been widely used in digital telephony. Audio signals have certain characteristics, some of which characteristics are not shared by video signals, facilitating the use of audio companding. An audio signal always has an average value which is 0. It is also a one dimensional signal whose instantaneous value is a function of time. Further, frequencies below 15 to 20 Hz. are quite rare in most audio signals of interest and frequency content above a few KHz. is of much lower value than the content in the range of about 300 to 3,000 Hz.

The usefulness of audio companding is based on human acoustic perception embodied in Weber's Law, which law is also applicable to visual perception. Weber's Law states that the just noticeable difference in amplitude of two similar signals is directly dependent on the amplitude of the signal. Mathematically, J/I is a constant over a wide range of amplitudes where J is the just noticeable difference in signal amplitude and I is the signal amplitude. In other words, as applied to human acoustic perception, a person would be able to hear a difference in sound between a sound of signal amplitude I and a sound of signal amplitude I+J. At least over a particular range of values for I, a person can hear smaller absolute differences in signal or sound volume for low volume sounds than the person can notice in high volume sounds. A person might hear a difference $J_1$ corresponding to the sound difference of two different sized pins being dropped. However, the person might not be able to perceive the difference in sound volume of two different bells being rung even though the absolute difference in volume between the two bells may be substantially greater than $J_1$.

Audio companding takes advantage of Weber's Law by first subjecting an audio signal to a near-logarithmic operation where both negative and positive portions are conditioned symmetrically. Commonly, the initial audio signal x(t) is processed to provide a signal y(t) for transmission as follows:

$$y(t) = \frac{X\max * \log[1 + \mu |x(t)|/X\max] * \text{sign}[x(t)]}{\log[1 + \mu]} \quad (1)$$

where Xmax is a positive maximum value which x(t) may reach, sign simply takes the sign or polarity of an instantaneous value, and $\mu$ is a constant selected for a particular application. For digital telephony, the value of $\mu$ may be 255.

In a digital system wherein the audio signal x(t) might be expressed in a time series of 12 bit samples (16 to 20 bits for very high dynamic range and high quality systems), a companded signal y(t) might be expressible by only 8 bits per sample and allow recovery of a signal audibly nearly identical to the original. This would therefore provide significant audio data compression as a benefit.

After transmission or storage, the companded audio samples are individually subjected to a non-linear operation complimentary to the operation described by equation one above. The recovered signal after performing the complimentary operation has an amplitude that is virtually linearly related to the input signal prior to companding. The output signal does have output samples with values which are different from the input signal, but only by an amount best expressed as a certain percentage of the input signal. Thus, higher amplitude signals will have absolute errors which are much larger than lower amplitude signals. However, recalling that Weber's Law indicates that the just noticeable difference of sounds heard by the human ear is proportional to the signal amplitude itself, the audio companding system may be designed such that errors introduced are kept below this just noticeable difference. This example exploits Weber's Law for the purpose of data compression without the amplitude compression associated with the companding adding unacceptable noise levels.

Instead of using audio companding simply to realize data compression, such companding may also be used to minimize the perceived noise added to an audio signal by a noisy transmission channel or storage medium. In such a case, the non-linear operation of equation one can be performed prior to transmission, but without any further quantization than was introduced by the Analog-to-Digital Converter operating on the linear input audio signal. The signal can then be passed through a digital-to-analog converter to obtain an analog signal to apply to the transmission or storage medium. After reconstruction at a receiver, the added noise is less apparent in the lower amplitude signals. Although the noise has actually increased in the higher amplitude signals, the signal to noise ratio is still high enough so that the signals are not perceived as noisy. As mentioned above, Weber's Law applies to human visual perception such that the just noticeable difference in luminance between two signals is proportional to the amplitude of the luminance signal. For example, when viewing a video screen one may be able to perceive noise in a darker portion of the screen, whereas noise of greater amplitude may go undetected in a brighter portion of the particular video image. Video systems have exploited this aspect of Weber's Law for many years. Specifically, many electronic cameras already have a "taking" amplitude characteristic which is non-linear and approximated by either a logarithmic curve or a power-law curve wherein the power is a fraction less than unity such that the curve defined by the camera has a curvature roughly similar to the usable part of the logarithmic curve. The slope of this characteristic on a logarithmic scale is called the gamma of the transfer characteristic. In the early days of black and white television, this phenomena was quite useful for two reasons. First, the picture tube has a transfer characteristic between control voltage input to luminance output which is a power-law of about 2.2, and thus roughly complimentary to the taking characteristic of some cameras. The second useful aspect is that transmission noise added to the television luminance signal between camera and receiver display is modified by the picture tube transfer characteristic, due to the non-linear power-law characteristic, such that it is attenuated in the darker image portions and expanded in the brighter image portions. This causes the noise to be more equally perceived by human viewing due to the Weber's Law which says that the just noticeable difference is a higher amplitude in brighter image areas and a lower amplitude in darker image areas. In other words, the non-linear characteristics tend to minimize the degree to which a human will perceive noise introduced in the video signal by its transmission.

A further characteristic of human sensory perception of images is of interest. This characteristic may be roughly termed spatial masking and a description of it may be found in the book *Two-Dimensional Signal and Image Processing* by Jae S. Lim, published by Prentice-Hall, a division of Simon and Schuster, Englewood Cliffs, N.J. 07632. Reference is made to section 7.3 which, in addition to a discussion of Weber's Law relative to visual human perception, includes a section 7.3.4 which relates to spatial masking. Spatial masking is much more pronounced (i.e., has greater effects) than Weber's Law. Stated simply and generally, spatial masking is the characteristic of human visual perception whereby noise which is noticeable in a local spatial area must be of higher amplitude if the local scene contrast is high, and noticeable noise can be of much lower amplitude for a local scene or image portion where the local contrast is lower. Another way to describe spatial masking is that the signal-to-noise ratio in any local area must exceed some constant value for the noise not to be visible in that area of the image.

An example may be useful in describing spatial masking. If a video image contains a piece of paper having text typed in fine print across its top and being blank at its bottom half, noise is more likely to be noticeable in that part of the image corresponding to the bottom half of the piece of paper. The contrast associated with the text on the top half of the piece of paper tends to mask noise on that part of the image, whereas noise having a magnitude not noticeable on the top half of the piece of paper may be readily noticeable on the part of the image corresponding to the bottom half of the piece of paper.

In the Lim book, it is stated that spatial masking might be used to reduce background noise. In particular, it refers to attempting to reduce background noise by spatial filtering which may involve some level of image blurring. The book further indicates that in high contrast regions, where the effect of blurring due to spatial filtering is more likely to be pronounced, the noise is not as visible, so little spatial filtering may be needed. The book does not go into details, but apparently the spatial filtering would simply involve application of the spatial filtering to signals which are recovered from a transmission or storage medium. Under those circumstances then, the blurring would be caused by effectively discarding signal information in the lower contrast regions along with noise.

In the storage or transmission of signals, the ability to recover a signal very close to the original signal with minimal effects of noise is important. However, there are also other characteristics which are important in various situations such as the ability to transmit a relatively large amount of information within a relatively small bandwidth. In other words, it is advantageous if one can transmit or store information without requiring an especially high capacity transmission channel or high capacity storage medium. A further characteristic desirable for transmission and storage of signals is the ability of the transmission or storage system to handle signals over a relatively wide dynamic range.

Whereas the previous discussion has focused on the impairments to analog signals undergoing either transmission or storage wherein the undesired noise is contributed by the process or medium of transmission or storage, a second mechanism causing noise and distortion is that of digital data compression wherein the compression process itself is lossy and creates the unwanted noise. In this case the impairment is produced by the source in the attempt to reduce the data by factors over a range of five to a few hundred. The subsequent digital transmission or storage in this case is presumed to be without error.

In order to realize the goal of allowing transmission and storage without requiring especially large capacity (bandwidth or other measure of capacity) transmission channels or storage media, while still providing an acceptable dynamic range, various predictive coding, transformation coding, and quantization techniques have been used. Such transformation techniques generally are used to try to minimize the sending or storage of redundant information. Such quantization techniques limit the values which are transmitted or stored. Although such transform (the discrete cosine transform is a common one) and quantization techniques are generally useful by reducing capacity requirements in transmission and storage of signals, such techniques introduce noise and distortion into the transmission and storage processes.

OBJECTS AND SUMMARY OF THE INVENTION

Accordingly, it is a primary object of the present invention to provide a new video companding technique.

A more specific object of the present invention is to provide video companding which uses spatial masking without introducing blurring into video images.

A still further object of the present invention is to provide video companding which will eliminate or minimize perceived noise in a recovered video signal.

Yet another object of the present invention is to provide video companding which will facilitate the transmission and storage of video signals relatively efficiently, while minimizing the data rate or bandwidth required for transmission or storage.

A still further object of the present invention is to provide video companding which is well suited to minimize the effects of noise and image distortion resulting from use of various video data compression encoding techniques such as transform and quantization techniques, predictive coding, and vector quantization.

Yet another object of the present invention is to provide a video companding technique which will reduce distortion and low contrast wash-out resulting from the use of known intra-frame video compression or motion compensated techniques.

The above and other objects of the present invention which will become apparent from the following detailed description are realized by a method in a signal processing system (analog system or digital system or combined analog and digital) of processing video data of performing a forward encode process including calculating a local average $A_i$ of a portion $V_i$ of a video input V, which portion corresponds to a portion $P_i$ of a video frame. The local average $A_i$ is subtracted from $V_i$ to generate a signal $B_i$. The signal $B_i$ is then subjected to a non-linear forward process to generate a signal $C_i$ which emphasizes any values of $B_i$ which correspond to any values of $V_i$ whose difference from $A_i$ is relatively small and which de-emphasizes any values of $B_i$ which correspond to any values of $V_i$ whose difference from $A_i$ is relatively large. The signal $C_i$ is then used to provide and apply an encoded output $E_i$ to a medium (storage medium or transmission medium). The above steps are repeated for i running from 1 to m where m is an integer larger than 1 and is the number of portions of the video frame for which the local average is calculated. The encoded output $E_i$ is recoverable from the medium to reconstruct the video frame with relatively low contrast parts of the video frame having an increased signal-to-noise ratio, the increased SNR for a particular low contrast part being increased relative to the SNR for that part in the absence of the forward encode process, and relatively high contrast parts of the video frame having a decreased SNR, the decreased SNR for a particular high contrast part being decreased relative to the SNR for that part in the absence of the forward encode process.

The use of signal $C_i$ to provide the encoded output includes calculating an offset $S_i$ as a local average of signal $C_i$ and subtracting the offset $S_i$ from $C_i$ to provide a signal $D_i$, and providing the encoded output $E_i$ from signal $D_i$. The encoded output $E_i$ is provided from signal $D_i$ by adding average $A_i$ to signal $D_i$.

The video input, encoder outputs, and various signals may be analog or digital values. In a preferred embodiment, the video input portions $V_i$, encoder outputs $E_i$, and signals $B_i$, $C_i$, and $D_i$ are sets of digital samples corresponding to values at different pixels (i.e., meaning locations within a video frame) in portion $P_i$. Each of $B_i$, $C_i$ and $D_i$ is a set of digital samples.

Preferably, the number m of portions of the video frame is greater than 25 and, more preferably, greater than 100. Likewise, it is preferred that each portion $P_i$ is a block having a width of a plurality of pixels and a height of a plurality of lines (i.e., corresponding to raster scan lines).

In a first embodiment, the offsets $S_i$ are not applied to the medium since the offsets $S_i$ may be calculated from the outputs $E_i$. However, an alternate embodiment applies the offsets $S_i$ to the medium such that later recovery of the video signal does not require calculation of offsets at the recovery stage (receiver if the video signal was transmitted or readout/playback if the video data was stored).

The encoded output $E_i$ may be directly applied to the medium. However, an alternate embodiment indirectly applies the output $E_i$ to the medium by first applying video data compression encoding such as transform coding and quantization, predictive coding, or vector quantization to the output $E_i$ before application to the medium.

An embodiment of the present invention may further include the step of motion compensation by having at least part of the video input V being the result of subtracting a video signal corresponding to a previous frame from a video signal corresponding to a current video frame.

The method for processing video data may alternately be described as a decode process inverse to the forward encode process including recovering a signal $F_i$ from a medium, signal $F_i$ corresponding to a signal $E_i$ as altered by noise and/or distortion, which signal $E_i$ was previously applied to the medium and corresponds to a portion $P_i$ of a video frame. A local average $G_i$ of signal $F_i$ and an offset $R_i$ are subtracted from signal $F_i$ to generate a signal $J_i$. A non-linear reconstruction process is applied to the signal $J_i$ to generate a signal $K_i$. The non-linear reconstruction process is monotonic and has a transfer curve with a relatively lower slope around the origin and a relatively higher slope further away from the origin. The reconstruction process has an inverse transfer characteristic from the forward process. The local average $G_i$ is added to signal $K_i$, the sum being signal $L_i$. The signal $L_i$ is then supplied to a video monitor to display a video frame with an increased signal-to-noise ratio in relatively low contrast parts of the video frame and a decreased signal-to-noise ratio in relatively high contrast parts of the video frame. In one embodiment of the present invention, the signal $F_i$ is recovered by performing an inverse quantization on coefficients from the medium and performing an inverse transformation on the results of the inverse quantization. The method may further include the step of motion compensation by reconstructing a current video frame by adding a video signal corresponding to a prior video frame to a video signal corresponding to the difference between the prior video frame and the current video frame.

The signal processing system for processing video data includes means for calculating a local average $A_i$ of a portion $V_i$ of a video input V, which portion corresponds to a portion $P_i$ of a video frame, for i running from 1 to m where m is an integer larger than 1 and is the number of portions $P_i$ of the video frame for which the local average is calculated. Means for subtracting the local average $A_i$ from $V_i$ are used to generate a signal $B_i$. Means are used for applying a non-linear forward process to generate a signal $C_i$ which emphasizes any values of $B_i$ corresponding to any values of $V_i$ whose difference from $A_i$ is relatively small and which de-emphasizes any values of $B_i$ corresponding to any values of $V_i$ whose difference from $A_i$ is relatively large.

Means for using the signal $C_i$ provide and apply an encoded output $E_i$ to a medium. The means to apply the forward process may specifically be a memory having a look-up table stored therein.

The means to use the signal $C_i$ may include a means to calculate an offset $S_i$ as a local average of $C_i$ and a means to generate $E_i$ from $C_i$ by subtracting the offset $S_i$ and adding average $A_i$.

In one embodiment, the means for using signal $C_i$ may include means for video data compression encoding of $E_i$ prior to its application to the medium.

The system may further include a means for motion compensation including means to generate the video input by subtracting a video signal corresponding to a previous frame from a video signal corresponding to a current video frame.

The signal processing system for processing video data according to the present invention may alternately be described as including means for performing a decode process inverse to the forward encode process by recovering a signal $F_i$ from a medium for i running from 1 to m where m corresponds to a number of portions of a video frame, signal $F_i$ corresponding to a signal $E_i$ as altered by noise and/or distortion, which signal $E_i$ was previously applied to the medium and corresponds to a portion $P_i$ of a video frame. Means for subtracting a local average $G_i$ of signal $F_i$ and an offset $R_i$ from signal $F_i$ generates a signal $J_i$. Means for applying a non-linear reconstruction process to the signal $J_i$ generates a signal $K_i$. The reconstruction process is monotonic and has a transfer curve with a relatively lower slope around the origin and a relatively higher slope further from the origin. Means for adding the local average $G_i$ to signal $K_i$ are used to generate a signal $L_i$. Means are provided for supplying $L_i$ to a video monitor to reconstruct a video frame with relatively low contrast parts of the video frame having an increased SNR (signal-to-noise ratio) and relatively high contrast parts of the video frame having a decreased SNR.

In one embodiment, the means for recovering includes means for performing an inverse quantization on coefficients from the medium and means for performing an inverse transformation on the results of the inverse quantization.

The system may further include a means for motion compensation including means for reconstructing a current video frame by adding a video signal corresponding to a prior video frame to a video signal corresponding to the difference between the prior video frame and the current video frame.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 3 is a graph of a non-linear function performed by the encoder of FIG. 1;

FIG. 4 is a graph of a non-linear function performed by FIG. 2 and complimentary (inverse) to the non-linear function of FIG. 3;

FIG. 6 is a block diagram showing how a memory may be used to realize the non-linear functions or processes of FIGS. 3 and 4;

FIG. 11 shows how the present invention may be used with known transform and quantization processes; and FIG. 12 shows how the present invention may be used in a motion compensated arrangement.

DETAILED DESCRIPTION

Figure 1:
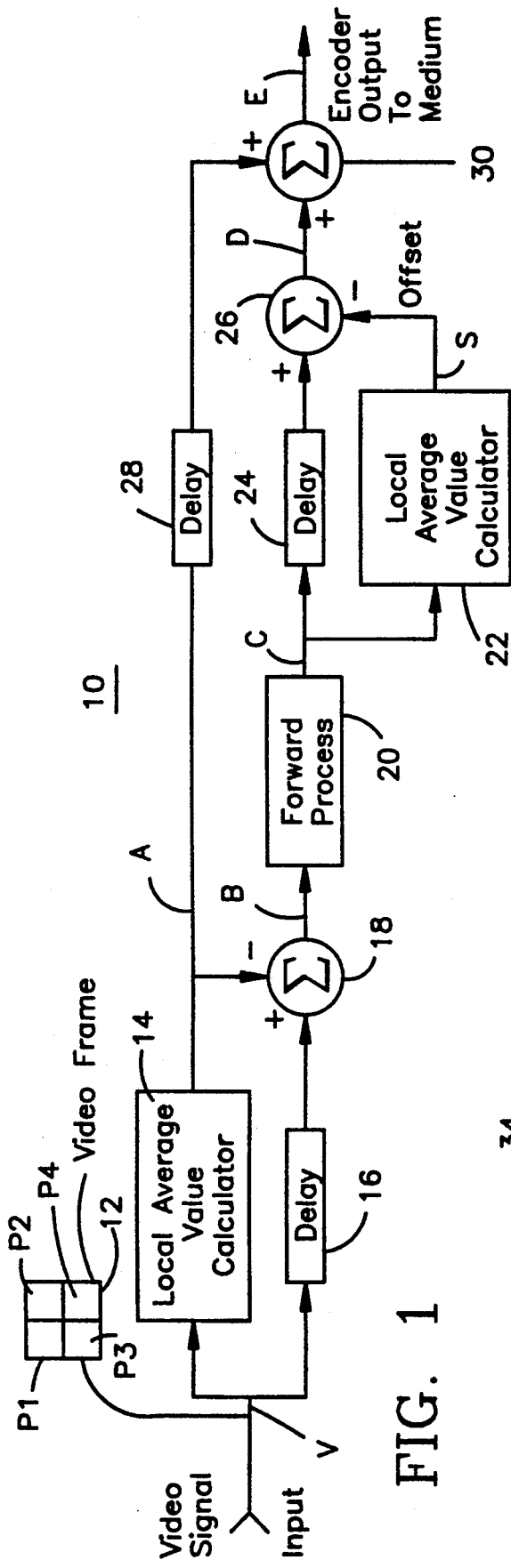
FIG. 1 shows a simplified block view of an encoder according to the present invention.

A video encoder 10 according to the present invention is shown in FIG. 1. Before discussing the blocks of FIG. 1 which perform an encoding or pre-conditioning process according to the present invention, a brief discussion of the overall principle of operation of the present invention may be useful. As shown in FIG. 1, a video signal input V is supplied to the encoder 10. The video signal input corresponds to a video frame graphically illustrated at 12 as including four different portions $P_1$ through $P_4$. In actual practice, a video frame or, alternately a video field, would usually be divided into significantly more than four portions. Preferably, each portion of the video frame 12 would correspond to $8 \times 8$ pixels (this value of 64 pixels being used hereafter) such that one could have $30 \times 32$ ($=960$) portions on a standard video frame.

The forward encoding process of FIG. 1 is designed to produce an encoder output E which is a modified signal derived from the video signal V such that a compand decode process which is the inverse of the process of FIG. 1 may be performed in order to recover a signal corresponding to the original video signal V. Most significantly, the encoder of FIG. 1 will modify the signal V to provide the output E in such a way as to take advantage of spatial masking. For example, if the portion $P_1$ has a low local contrast, the signal-to-noise ratio will be increased at a decoder (discussed below) output when noise is added to the signal between the encoder and the decoder of the invention (i.e., over what it would be absent the encoding) by the encoding process of FIG. 1 since humans can more readily perceive noise in such portions of an image. At the same time, if the portion $P_2$ has a relatively high local contrast, the process of FIG. 1 may decrease the signal-to-noise ratio as observed at the output of the decoder as a result of transmission or storage noise (or noise and/or distortion from digital data compression techniques for the FIG. 11 embodiment discussed below) for that portion of the image, although the signal-to-noise ratio would still be sufficiently high that noise would not be noticeable. By improving the SNR in some portions of the video frame and degrading the SNR in other portions of the video frame, one can store or transmit the same amount of information without any need to increase the capacity of the transmission or storage medium.

The video signal input V may represent the signal from a monochrome television camera or other image signal source. Alternately, the input video signal may represent any of the red, green, and blue signals from a color imaging device, it being understood that the process performed by the encoder of FIG. 1 would be performed on each of the red, green, and blue signals. Other video signals might be processed by the technique of FIG. 1. For example, the video signal might be the luminance signal in a system where color was provided by having one luminance signal and two chrominance signals. In a system where the color was provided by a composite signal, the luminance signal might be removed and processed in this manner before recombination with unchanged other signals.

The signal V supplied to the encoder 10 of FIG. 1 may be thought of as having four separate (in time) portions, $V_1$ through $V_4$, each portion corresponding to a portion $P_1$ through $P_4$ of the video frame 12. The video signal supplied at the input of encoder 10 should be in the sequence of pixels corresponding to blocks, such a $P_1$, $P_2$, $P_3$, and $P_4$ as shown in FIG. 1. Since a usual video signal from an image source is in a raster scan format, a raster scan to block format converter such as discussed relative to FIG. 5 below is used to obtain the signal V. The video signal V initially has values sequentially representing each portion of a horizontal line within portion $P_1$ until a value corresponding to each pixel within the portion $P_1$ has been provided. The video signal input V will then have values representing each pixel in portion $P_2$ and so forth with respect to portion $P_3$ and $P_4$ Note that each of the signal portions $V_1$ through $V_4$ includes a value for each pixel within the corresponding portion of the video frame. That is, $V_1$ is a function of time and depends upon where the scan is within the portion $P_1$.

When the video signal input V is applied to the encoder 10, the signal portion $V_1$ is supplied to a local average value calculator 14. Preferably, this calculates an unweighted (unitary weighted) average, but a weighted average might also be used. Additionally, signal portion $V_1$ is applied to a delay 16. The local average value calculator 14 calculates the average value for the signal portion $V_1$ corresponding to the image or frame portion $P_1$. Assuming that the portion $P_1$ represents a width of eight pixels and a height of eight lines, the calculator 14 would add 64 different values of $V_1$ and output an average $A_1$ (one of four averages corresponding to the four portions of video frame 12, the four averages being collectively referred to as A).

At block 18, the average $A_1$ will be separately subtracted from each of the 64 values corresponding to $V_1$. The delay 16 simply allows calculation of the average $A_1$ before the first value of $V_1$ is supplied to the subtractor 18. By the time the subtractor 18 is subtracting the average $A_1$ from the first value of $V_1$, signal portion $V_2$ will be at the input or left side of the calculator 14.

The output of subtractor 18 will be 64 sequential values of $B_1$, each of which corresponds to one of the values of $V_1$ minus the single average $A_1$. (In the discussion which follows, it will be appreciated that the signal B is simply a shorthand way of referring to signal portions $B_1$ through $B_4$. Likewise, signals C, D, and E will consist of four signal portions also noted with subscripts, each signal portion also representing a set of 64 values assuming that each portion of video frame 12 corresponds to 64 values.)

Each of the 64 values of $B_1$ is supplied to a non-linear process block 20 which takes a non-linear function upon the 64 values of $B_1$. The non-forward linear function may be that shown by the curve of FIG. 3 and the equation shown for that curve. That equation, commonly called the mu-law is the equation one discussed above in connection with audio companding. Whereas the value for mu for audio companding is often 256 or thereabouts, the value of $\mu$ would preferably be about four to fifteen for video companding according to the present invention. Although the equation illustrated in FIG. 3 is believed to represent a well-suited non-linear process, other non-linear processes (functions defined over the possible inputs) might be used provided that they are monotonic and have an output versus input curve with a greater slope adjacent to the origin than further from the origin. The non-linear process which is used might be a curve composed of linear segments. To avoid clipping or loss of signal data, the curve of output versus input characteristics corresponding to the non-linear process also would necessarily have a non-zero and finite slope over the range of values which B may have. The transfer characteristic of block 20 corresponding to the function or process of FIG. 3 should have a maximum value for the slope around the input value of 0 and should have odd symmetry about the value 0, 0.

The application of the transfer characteristic of block 20 corresponding to the forward process to the values $B_1$ provides values $C_1$. The transfer characteristic effectively emphasizes signal values corresponding to values of $B_i$ which are close to the average $A_1$ and effectively de-emphasizes signal values corresponding to pixels which have relatively great differences in values from the local average $A_1$. Thus, the signal values at locations where noise would be most noticeable have been emphasized, whereas the signal values where noise is least noticeable have been de-emphasized.

The average value of $B_1$ is zero since it is the result of subtracting average $A_1$ from signal portion $V_1$. However, the average value of $C_1$ is not necessarily zero since performing a non-linear process upon a signal having an average value of zero does not necessarily result in a signal with an average value of zero.

The signal $C_i$ is supplied to a local average value calculator 22, which calculates a local average of signal portion $C_1$, which average will be referred to as offset $S_1$. The signal portion $C_1$ is also supplied to a delay 24 having a delay equal in magnitude to the time from application of the first value of $C_1$ to the calculator 22 until the offset $S_1$ appears at the output of calculator 22. That delay will be as long as the time for the signal portion $C_1$. The delay 24 insures that values of $C_1$ arrive at summer (subtractor) 26 at the same time as the offset $S_1$ such that summer 26 subtracts the offset $S_1$ from the signal portion $C_1$ to generate a signal $D_1$ having an average value of zero. A delay 28 insures that average $A_1$ arrives at a summer 30 at the same time as the signal portion $D_1$. The summer 30 adds $A_1$ and signal portion $D_1$ to generate a signal portion $E_1$ which has an average value of $A_1$.

The signal portion $E_1$ is applied to storage is transmission. For example, a storage medium might be CD-ROM, video tape, or any of numerous other known storage devices. If the medium is a transmission channel, the signal could be sent by radio waves, microwaves, laser, electrical cable, or any other transmission system.

The summing performed by summers 26 and 30 might be interchanged in FIG. 1 since changing the order of application of two linear processes does not change the result. If desired, one might subtract the offset $S_1$ the average $A_1$ and then supply the result to a summer which adds that result to the delayed values of $C_1$. Note that the various delays in encoder 10 mean that, for example, when the summer 30 is adding $A_1$ to $D_1$, the calculator 22 will be using $C_2$ to calculate offset $S_2$ and the calculator 14 will be calculating $A_3$ using input signal portion $V_3$.

The above explanation has assumed use of uniform averaging in the companding process. However, non-uniform averaging might be used as discussed hereafter.

The description of the Video Companding process embodies a technique for subtracting the average value of a block of input pixels from each of those pixels counted in the average at the encoder prior to performing the non-linear operation on the resulting pixel differences. An important aspect of the separation of the average value of the pixels is to allow it to be added back to the pixel differences after they have been companded so it need not be transmitted or stored separately from the other transmitted or stored data. In a similar way, the same is true of the offset signal created by the non-linear companding.

In general, a signal comprised of a plurality of individual samples, such as a block of picture elements, may be separated into two new signals such as has been shown in the Video Compander process wherein the first of the two new signals is the single average value term and the second signal is a number, D, of differences equal to the original number of picture elements in the block. These two new signals can be re-combined to yield exactly the original set of picture elements. The method employed so far has consisted of an average using uniform averaging of all the pixels in the block of pixels.

Other averages which possess non-uniform weighting of the picture elements are also possible which have the desirable property that the average can be separated from a block of picture elements resulting in a first signal having a single weighted average value and the second signal being difference values, whose number of values is equal to the number of values in the original signal.

A more interesting type of average is in the form of a low-pass filter function which can separate a signal into two new signals, the first being one which contains the average value and low frequency signal components and the second containing the differences between this first signal and the original. The second signal is the high-pass filtered version of the original signal. This type of filtering can be performed by the relatively new exact reconstruction filters. These filters are Finite Impulse Response (FIR) types of filters whose footprints on the original signal samples contain only a finite number of points and whose shape is symmetrical about the center of the filter function. The values of the signal being low-pass filtered are a maximum near the center of the FIR filter and relatively lower toward the edges. The theory and implementation of these filters is discussed in detail in "Subband Image Coding", edited by John W. Woods, and published by Kluwer Academic Publishers, New York in 1991.

The reason for interest in these filters concerns implementation in analog systems wherein the recovery of the sampling timing at the decoder may be imprecise such that the samples of the incoming analog signal are digitized at points in the signal which are slightly different from those digitized by the encoder. The non-uniform FIR filter averaging is performed such that the sample points near the center of the average are weighted more strongly than those sample points near the edge of the filter. Thus, if the sampling structure at the decoder is shifted slightly from that employed at the encoder, the resulting averages will still be most heavily dependent upon the same range of input values which were used at the encoder and much less upon values which are newly included, or newly omitted, from the average formed at the decoder.

In addition, the overlapping FIR functions tend to provide averaging whose value generally is closer at any sample time to the input sample itself due to this average being able to gradually change from one sample to the next, rather than the block average which has a step function change from one block to the next. This provides better Video Companding as the spatial masking property of the human visual system changes gradually in a spatial direction (horizontally or vertically) rather than in a block fashion.

The FIR functions involve more extensive arithmetic calculation than the uniform averages and in some cases may therefore be less desirable.

Figure 2:
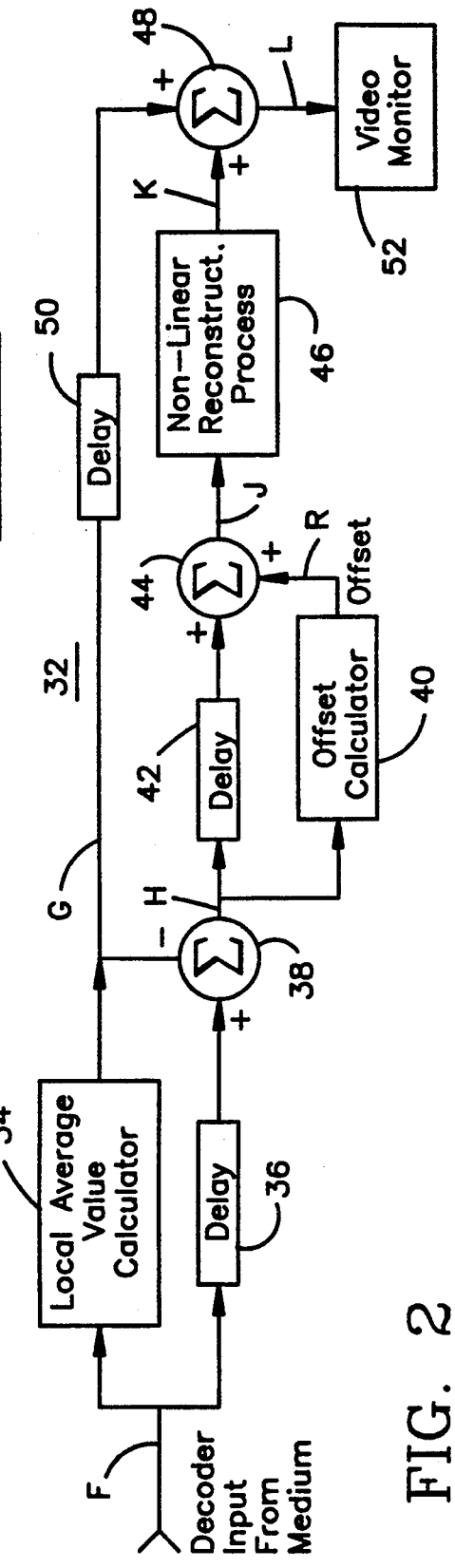
FIG. 2 shows a simplified block view of a decoder according to the present invention.

Before discussing the details of decoder 32 of FIG. 2 which is used to reverse the operations of encoder 10, it is noted that the decoder 32 includes signals which correspond to signals from the encoder 10 except as altered by noise introduced in the transmission or storage process. Therefore, table I below may be useful to explain the correspondence between variables of the encoder 10 and the decoder 32 and to summarize the notation used in this discussion.

TABLE I

VARIABLE CORRESPONDENCE AND NOTATION

| Encoder | Decoder | Notation (i runs from 1 to m where m is an integer greater than 1 and is the number of portions of the video frame for which the local average is calculated, preferably 960) |
|---|---|---|
| V | L | Note 1 |
| A | G | Note 2 |
| B | K | Note 1 |
| C | J | Note 1 |
| S | R | Note 2 |
| D | H | Note 1 |
| E | F | Note 1 |

Note 1: These variables represent signals which are a combination of signal portions. Thus, V is composed of all $V_i$. For m = 4, V is composed of $V_1$, $V_2$, $V_3$ and $V_4$. Each signal portion such as $V_1$ may be an analog signal or a signal having a series of digital samples having different values.

Note 2: These variables are shorthand for one of a set of indexed values. Thus, A is shorthand for one of $A_i$. For m = 4, A would be one of $A_1$, $A_2$, $A_3$ and $A_4$. $A_1$ is preferably a single analog value or digital value, as is $A_2$, $A_3$, $G_1$, $G_2$, etc.

The inputs such as $F_1$ are applied at the left side of the decoder 32 as shown. The signal F, composed of signal portions $F_1$, $F_2$, etc., corresponds to signal E except for the effects of noise or distortion introduced by the transmission or storage process. The signals such as $F_1$ are supplied to a local average value calculator 34 and a delay 36 which are arranged in parallel. The local average value calculator 34 calculates a local average $G_1$ which is then subtracted from $F_1$ at the subtractor 38. The delay 36 simply insures that $F_1$ reaches the subtractor 38 at the same time as the local average $G_1$. The average $G_1$ will be identical to the average $A_1$ except for the effects of noise, which effects are likely to be very small since it is an average taken over a large number of samples.

The output from subtractor 38 is a signal portion $H_1$. The signal portion $H_1$ is fed to an offset calculator 40 which calculates an offset R by a technique which will be described in detail below. Basically, the value $R_1$ is determined such that, when $R_1$ is added to $H_1$, the resulting 64 values (in a 64 pixel digital system) will have an average value of zero. The signal portion $H_1$ is fed to a delay 42 in parallel to the offset calculator 40 such that $H_1$ reaches the summer 44 at the same time as offset $R_1$. Upon the summer 44 performing the indicated addition, its output $J_1$ is supplied to a non-linear reconstruction process 46 which has a transfer characteristic shown by FIG. 4 as being the inverse of the transfer characteristic of the process of FIG. 3. Specifically, the reconstruction process is the inverse function from the forward process and has a transfer characteristic with a slope which is relatively low around the origin and which is higher away from the origin. Applying the reconstruction process of block 46 effectively removes the emphasis in the signals from the forward process 20. Accordingly, the output signal portion $K_1$ of block 46 generally corresponds to signal portion $B_1$ of FIG. 1 except for the introduction of noise and/or distortion from the transmission or storage process. However, such noise or distortion will be less perceivable as a result of the present spatial masking characteristics of the encoding and decoding of the present invention.

The signal $K_1$ is supplied to a summer 48 which also receives $G_1$ by way of delay 50, which delay simply insures that $G_1$ arrives at the summer 48 at the same time as $K_1$. The output of summer 48 is $L_1$ which corresponds to video signal $V_1$. The signal portions $L_1$ corresponds to portion $P_1$ of original video frame 12 from FIG. 1, signal portion $L_2$ corresponds to portion $P_2$, etc. The various signal portions $L_1$, $L_2$, etc., which may be collectively referred to as signal L are supplied to a video monitor 52 which will display an image corresponding to the video frame 12 which was originally stored. Since the signal L is in a pattern of blocks ($P_1$, $P_2$, etc.) at an output of summer 48 as discussed above with respect to video frame 12 of FIG. 1, one may use block-to-raster scan circuits (discussed below, not separately shown) to convert the signal to the usual raster-scan format for display on a video monitor.

Figure 5:
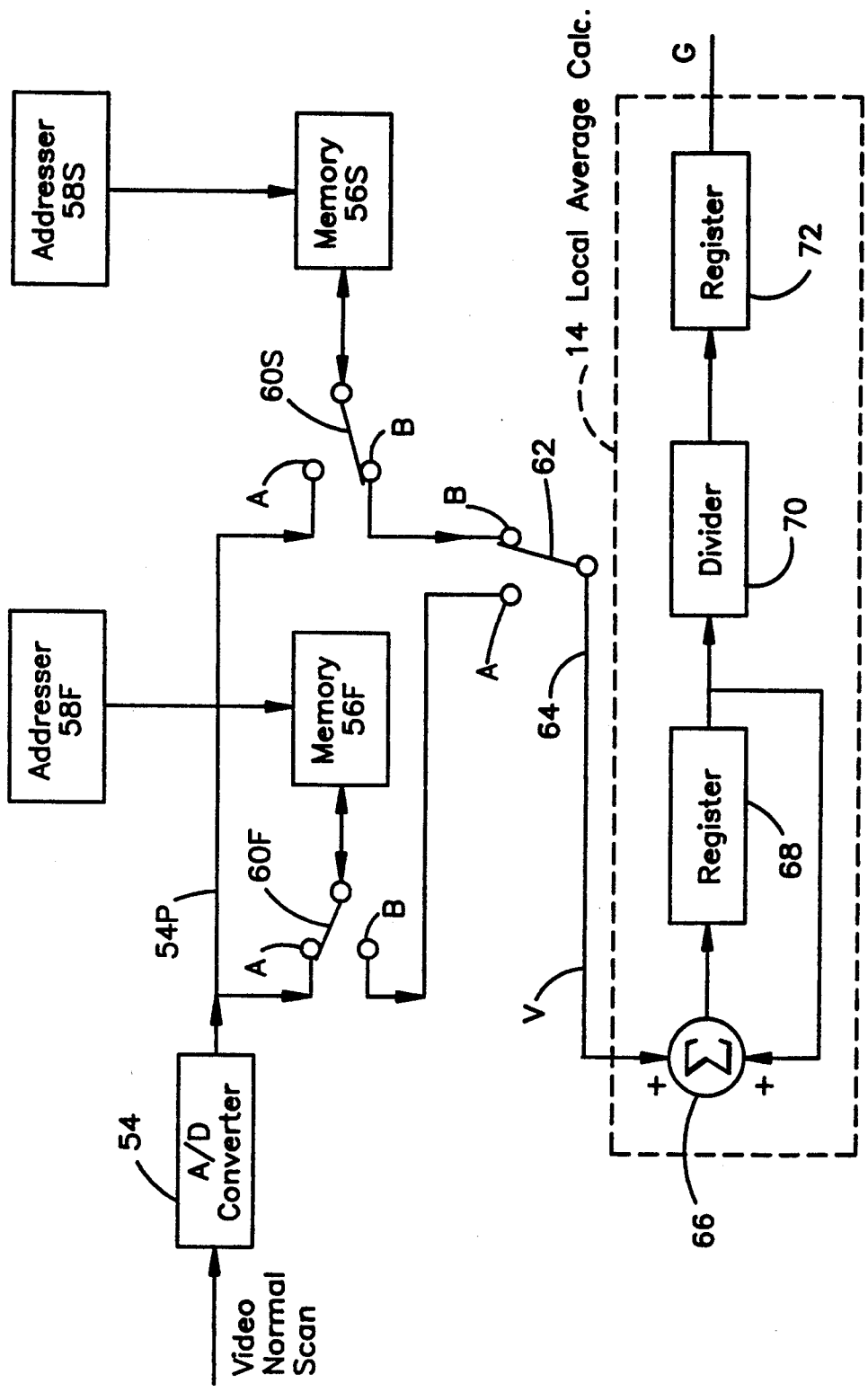
FIG. 5 shows an arrangement which may be used at the input of the encoder of FIG. 1 for rearranging the order in which data is supplied.

Turning now to FIG. 5, an arrangement is shown for producing the video signal input V of FIG. 1 and a more detailed diagram of the local average calculator 14 of FIG. 1 is shown. An analog-to-digital converter 54 is supplied an analog video signal having a raster scan pattern. The scan pattern consists of horizontal lines beginning at the top of a particular image frame.

The output of the converter 54, which output follows the normal raster scan pattern, is supplied on line 54P to one of first and second memories 56F and 56S, which memories are addressed by corresponding addressers 58F and 58S. Although line 54P and various other lines in FIG. 5 are shown as single lines for ease of illustration, they may be multiple lines in order to carry different bits of a digital sample in parallel. Data to and from the memories 56F and 56S are channeled by way of the corresponding switches 60F and 60S.

In the illustrated conditions of FIG. 5 with switch 60F in its A position, switch 60S in its B position, and an output switch 62 in its B position, addresser 58F will be addressing memory 56F in a raster scan pattern corresponding to the video signal coming into converter 54.

The video frame which is changed to digital form by converter 54 is stored in memory 56F by way of switch 60F. At the same time, a previous video frame which was stored in memory 56S is being output to line 64 by way of switches 60S and 62. Importantly, the addresser 58S is addressing memory 56S in a pattern corresponding to the portions, such as blocks, into which the video frame has been divided. Referring back momentarily to FIG. 1, addresser 58S would address each pixel of portion $P_1$ beginning at the upper left and horizontally sweeping each line portion within frame portion $P_1$ from left to right. After addresser 58S has swept through portion $P_1$, it would then sweep through portion $P_2$ of video frame 12 using the same pattern. The addresser 58S would address each pixel of the video frame previously stored in memory 56S using that pattern. If each of the portions of the video frame is an eight by eight pixel portion, the video signal on line 64 will then be in different eight by eight pixel signal portions $V_i$. A previously stored video frame will be read out of memory 56S at the same time as a new video frame is written into memory 56F.

After completion of the writing of a video frame into memory 56F and reading out of memory 56S, the switches 60F, 60S, and 62 will all change to the opposite positions from the illustrated positions. Addresser 58F will then address memory 56F using the scan pattern wherein each of the portions $P_i$ are read out sequentially, these signals being supplied to line 64 by way of switches 60F and 62. At the same time, the next frame will be written into memory 56S, addresser 58S now addressing the memory 56S using the raster scan pattern.

In the manner illustrated in FIG. 5 or by using other techniques, a video signal may be reformatted from the raster scan pattern into the scan pattern in which each of several portions of a video frame are scanned in order. The line 64 of FIG. 5 corresponds to the video signal input line of FIG. 1. It should also be noted that the preferred arrangement uses blocks as the portion $P_i$ for which the local averages will be calculated. However, one might alternately use several pixels on the same horizontal line, a single row of pixels on different horizontal lines, or other patterns including overlapping patterns.

It will also be appreciated that the dual memory arrangement of FIG. 5 might be used at the output of summer 48 of FIG. 2 in order to convert from the portion-by-portion scan pattern into the usual scan pattern in order to supply the video monitor 52 of FIG. 2.

FIG. 5 further illustrates an arrangement which might be used for the local average value calculator 14 of FIG. 1. The structure shown for calculator 14 could also be used for the calculator 22 of FIG. 1, calculator 34 of FIG. 2, and calculator 40 of FIG. 2. As shown in FIG. 5, the calculator 14 includes a summer 66 which sums the signal V and supplies an output to register 68, the output of which is sent back to the summer 66. Assuming that the video portions are eight by eight pixels, the register 68 initially stores the value of the first pixel and the summer 66 adds that value to the value of the second pixel, which is then stored in the register 68. Following that general procedure, the register 68 eventually holds the value of the sum of all 64 pixels, which value is then supplied to divider 70 for division by 64. The register 72 will then receive the average value of the pixels within a portion corresponding to the 64 pixels in question. The register 72 will hold the value of the average until a new average is calculated. For example, and referring back momentarily to video frame 12 of FIG. 1, the register 72 will hold the average corresponding to portion $P_1$ at the same time as the register 68 is in the process of accumulating the values corresponding to video portion $P_2$. It will be readily appreciated that various other arrangements could be used for local average calculation and that details need not be provided beyond the simplified discussion of operation as presented. A weighted average might be used. A more complex arrangement would use a different running average for each pixel such that different blocks had overlapping pixels. The arrangements might be implemented in software to be used with a digital signal processor.

Turning now to FIG. 6, a specific arrangement for the forward process block 20 of FIG. 1 will be illustrated. Generally, it should be noted that the arrangements of FIGS. 1 and 2 might be realized in an analog fashion, a digital fashion, or a combination of analog and digital components. The analog component for the forward process block 20 could be a non-linear function generator (not separately shown). However, in the more preferred case, the forward process 20 of FIG. 1 would be a memory 20M of FIG. 6 in which a lookup table corresponding to the curve or transfer function of FIG. 3 would be stored. As shown in FIG. 6, the signal B would be supplied as the address to memory 20M and the output C would be the value which is read out. The memory 20M could be a ROM, PROM, portion of a read-write memory commonly referred to as RAM, or various other types of memory. The reconstruction process of block 46 of FIG. 2 could be constructed in similar fashion.

Figure 7:
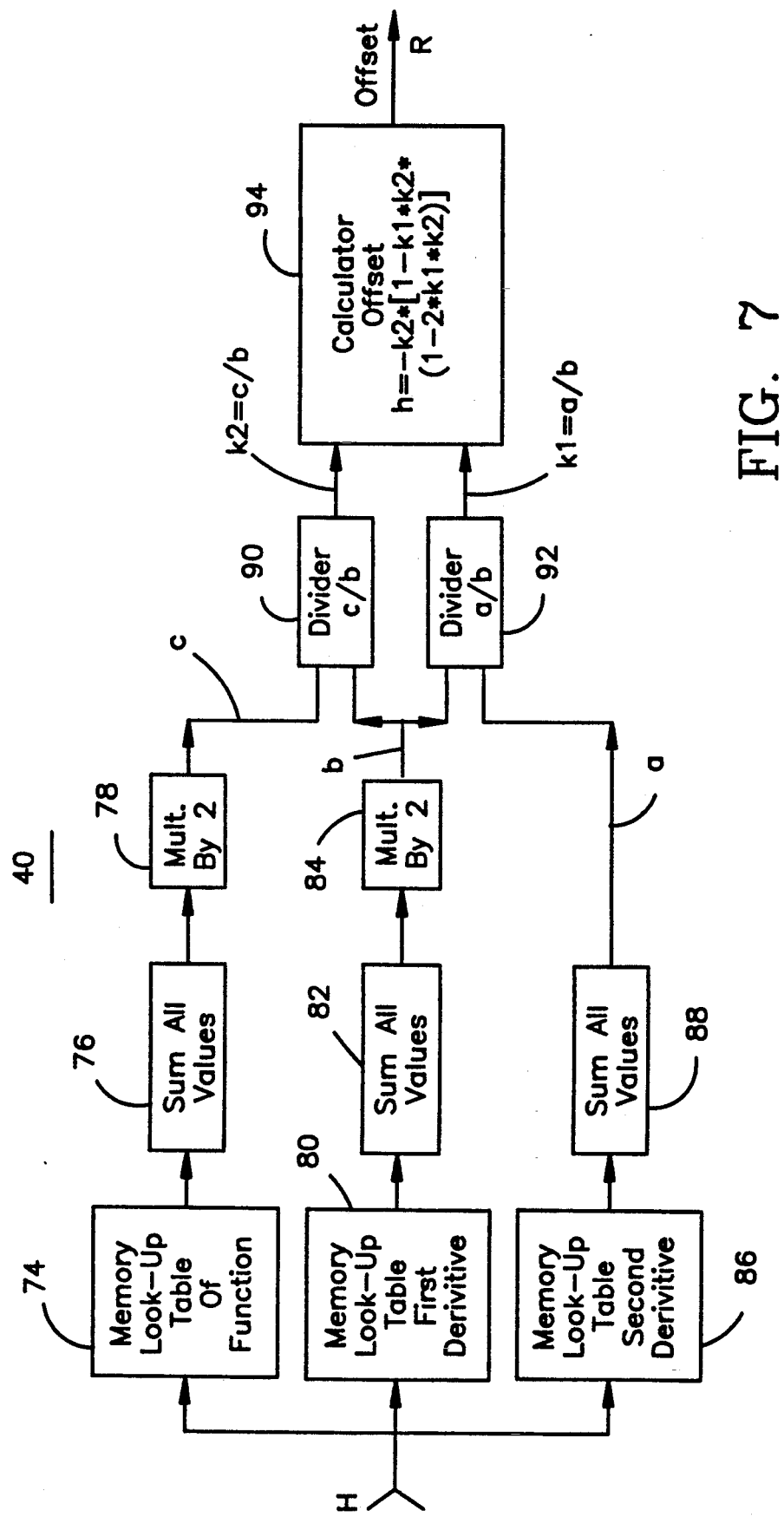
FIG. 7 is a block diagram of an offset calculation arrangement which may be used by the decoder of FIG. 2.

The offset calculator 40 might simply use a trial and error method. Specifically, an offset $R_i$ (recall that R is simply a shorthand reference to any one of $R_i$ where i runs from 1 to m) is the same as offset $S_i$ of the encoder of FIG. 1. If the offset $R_i$ is the correct value, then $K_i$ will correspond to $B_i$ and will have an average value of zero. Therefore, one could calculate each of the values of R by using such a trial and error technique. The procedure is to try several values of $R_i$, the values being zero and a few positive values and a few negative values for $R_i$. For each value of $R_i$, there will be determined a complete set of $J_i$ and $K_i$ values. The value of $R_i$ which results in the average value of the $K_i$ values being equal to zero is the correct value to use for $R_i$. However, FIG. 7 shows a more direct method based upon a Taylor series expansion which involves knowledge of the mathematical derivatives of the non-linear transfer function or curve of FIG. 4.

The well-known Taylor series expansion for the value of a function at the point (x+h) is given as an infinite series as follows:

$$f(x+h) = f(x) + h \cdot f'(x) + (h^2/2!) \cdot f'(x) + (h^3!) \cdot f''(x) + \ldots \quad (2)$$

The higher order derivative terms become smaller and smaller for continuous functions of the type desired for use as the reconstruction process (which is the inverse of the forward process of block 20 of FIG. 1). Thus, a practical system can be implemented using only the first three terms in the series. In keeping with the normal notations for a Taylor series expansion, the x is an input to the function and the constant h is a change in input.

Considering the function f(x) as the equation of the reconstruct curve or function of FIG. 4 and that the h is the unknown offset to be determined, a technique will be described where 64 pixels are in a block or video frame portion. Adding up 64 versions of equation two above and ignoring terms beyond the second derivative we have equation 3 as follows:

$$\Sigma f(x+h) = \Sigma f(x) + \Sigma h^* f'(x) + \Sigma (h^2/2!)^* f''(x) \quad (3)$$

in which the summations are for 64 different values of x corresponding to the 64 pixels in a particular portion of the video frame. The values of x for those 64 portions (these are the values of H in FIG. 2) are known. More importantly, it is known that 1/64th of the left side of equation 3 is equal to zero (referring back to FIG. 2 momentarily, the average of the reconstruction process over a particular block must be 0), it follows that the left side of equation 3 is equal to zero. Equation 3 can therefore be reduced to the following quadratic in h:

$$0 = a^* h^2 + b^* h + c \quad (4)$$

where $a = \Sigma f''(x)$, $b = 2^* \Sigma f'(x)$ and $c = 2^* \Sigma f(x)$ it being understood that the summations are over 64 different values of x corresponding to the 64 pixels within a particular portion of the video frame.

Solving the quadratic equation 4 above for h and using the binomial series expansion for the square root in the quadratic solution (only the positive root is used) one can solve for h as follows:

$$h = -c/b + a^* c^2/b^3 - 2^* a^2 {}^* c^3/b^5 \quad (5)$$

Taking k1 equals a/b and k2 equals c/b, h can be written as:

$$h = -k2^* [1 - k1^* k2^* (1 - 2^* k1^* k2)] \quad (6)$$

Using the above technique, the offset calculator 40 of FIG. 7 may be used in the FIG. 2 arrangement in order to explicitly calculate the offset $R_i$ for a particular block of pixels corresponding to a portion of the video frame. This technique avoids the previous need to try several values of $R_i$ to find the correct one. In particular, the input H is supplied at the left side of offset calculator 40 and corresponds to x in the discussion above relative to equations 2 and 3. Block 74 is a memory having the function values corresponding to the transfer curve of FIG. 4 stored therein. Block 74 may be implemented using the same type of arrangement as discussed above with respect to FIG. 6 except that block 74 would, as with block 46 of FIG. 2, have a look-up table of values corresponding to transfer gain or function of FIG. 4. Block 74 will sequentially supply the function values later used in the calculation for c above to a block 76 which sums all of the function values corresponding to the 64 pixels of a particular portion of a video frame. The output of block 76 is supplied to multiplier 78 which simply multiplies by two. The output of the multiplier will be c. Note that the sum all values block 76 may have two registers (not separately shown) similar to the local average calculator 14 of FIG. 5 such that block or component 76 may be summing the values from a particular portion of the video frame such as $P_2$ of FIG. 1 at the same time as supplying a previously calculated sum of values corresponding to Portion I of the video frame 12 of FIG. 1.

Memory 80, which may be simply a different part of a common memory with memory 74, supplies 64 first derivative values to the block 82 which sums the 64 values corresponding to a particular portion of the video frame. The summer or sum all values block 82 supplies the sum to block 84 which multiplies the output by two in order to supply b. Memory 86 and summer 88 calculate a by looking up and summing values for the second derivative in similar fashion to the parallel components discussed above. The output of summer or sum all values block 88 does not need to be multiplied by two.

The outputs of blocks 78, 84, and 88 are supplied to dividers 90 and 92 which respectively calculate k2 and k1 in accord with the above definitions. The calculator block 94 then calculates the offset h using equation 6 above. That offset h is the offset $R_i$ which is used in the arrangement of FIG. 2, it again being recalled that R is simply being used as a shorthand way to refer to any of the particular offsets $R_i$.

Figure 8:
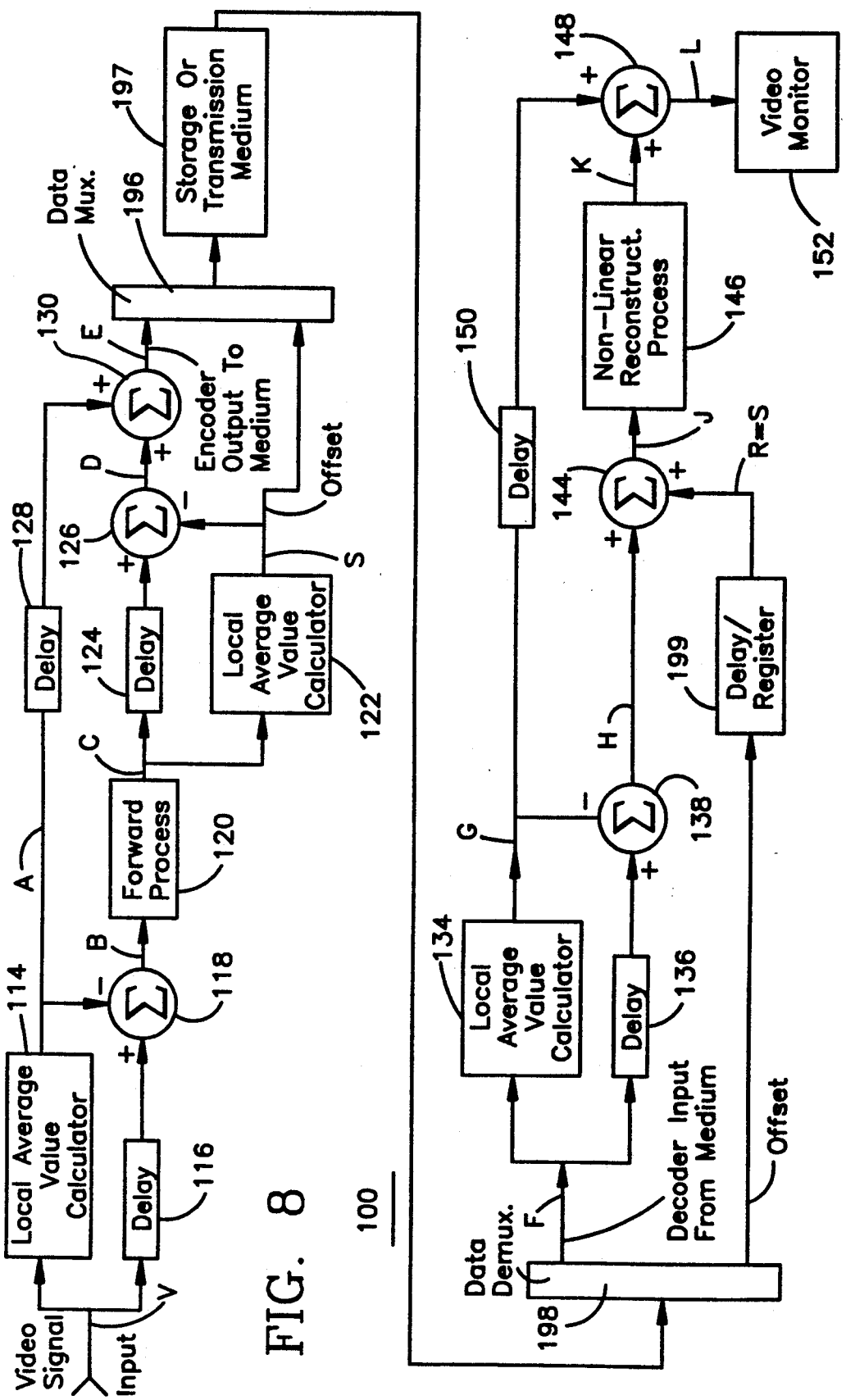
FIG. 8 shows both an encoder and a decoder arrangement which are alternatives to the encoder of FIG. 1 and decoder of FIG. 2.

Turning now to FIG. 8, an alternate system 100 according to the present invention is illustrated. The system 100 combines a modified version of the encoder 10 of FIG. 1 with a modified version of the decoder 32 of FIG. 2. The components of the system 100 are numbered in the "100" series with the same last two digits as the corresponding component, if any, from the designs of FIGS. 1 and 2. Thus, components 114, 116, 118, 120, 122, 124, 126, 128, 130, 134, 136, 138, 144, 146, 148, 150, and 152 function in the same manner as the corresponding components in FIG. 1 or FIG. 2 and need not be discussed in detail. Emphasis will instead be placed on the differences between the arrangement of FIG. 8 and the arrangements of FIGS. 1 and 2.

The output S of calculator 122 is, in addition to being transmitted to summer 126, supplied to a data multiplexer 196. The multiplexer 196 applies the offset to the storage or transmission medium 197. Although this slightly increases the capacity requirements for the storage or transmission medium, this system may be useful in some applications where one wishes to avoid having to calculate the offset at the decoder part of the system.

As shown, the data stream is supplied from the medium 197 to a data demultiplexer 198 which separates out the data values F corresponding to particular pixels from the offset. The offset is supplied from demultiplexer 198 to the summer 144 by way of a delay register 199. The register 199 has a delay in it to insure that the offset $S_i$, which is equal to the offset $R_i$, is supplied to the summer 144 at the same time that the signal portion $H_i$ is supplied to that summer. Although the register 199 is shown as a single block for ease of illustration, one could also illustrate this by a separate delay block between the demultiplexer 198 and the register 199.

By storing or transmitting the offset in the manner of the FIG. 8 arrangement, one avoids the need for a delay 42 (FIG. 2 only) and, more importantly, one avoids the need to have an offset calculator like 40 of FIG. 2. Thus, the decoding stage of the system may be simpler.

In addition to implementing the arrangements of FIGS. 1, 2, 7, and 8 using digital hardware or analog circuits, these designs might be implemented using software.

Figure 9:
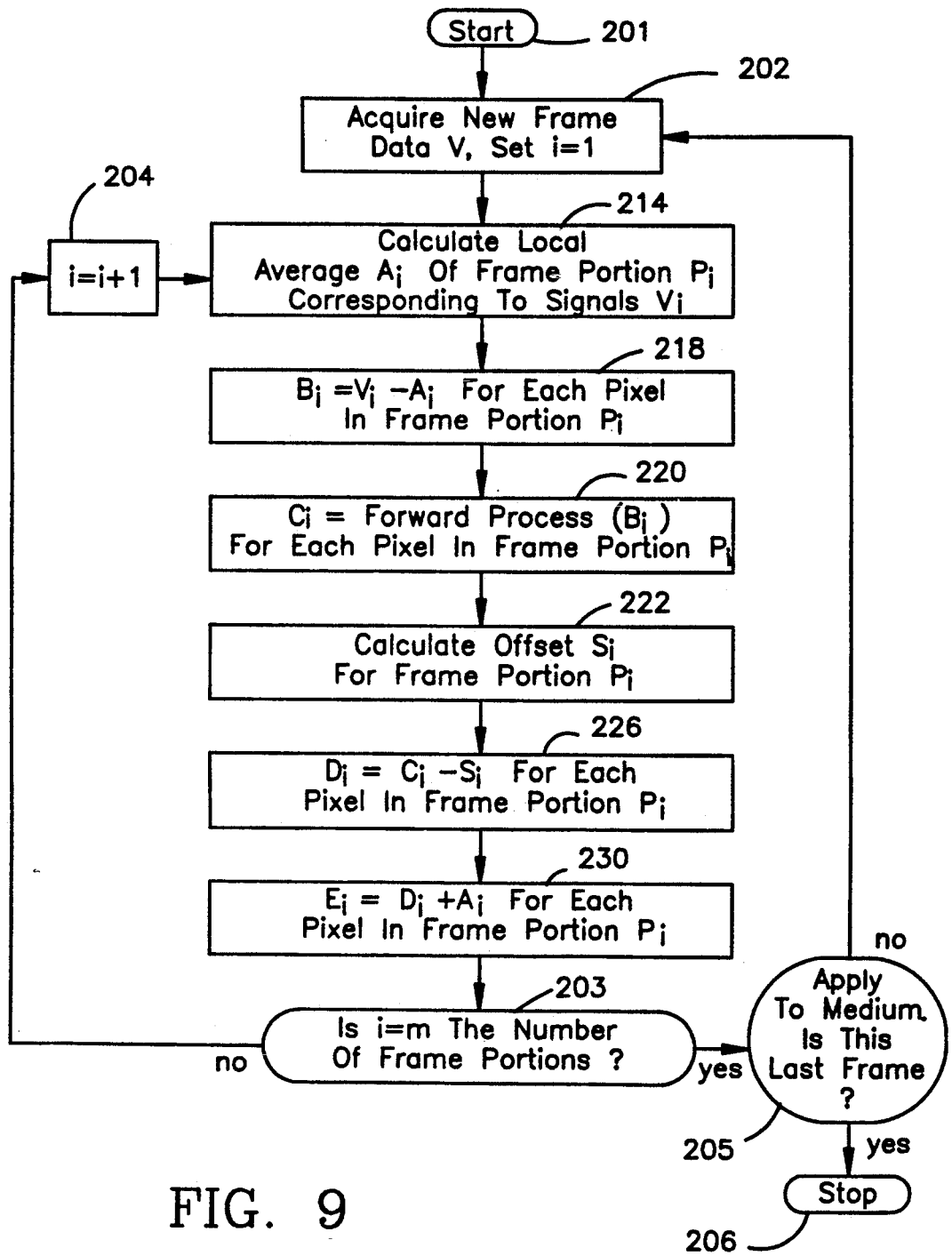
FIG. 9 is a simplified flowchart illustrating the steps of the encoding process of FIG. 1.

A flowchart for the encoding technique of FIG. 1 is shown in FIG. 9. The blocks of FIG. 9 are in the "200"

series with the same last two digits as the corresponding block in the block diagram of FIG. 1. Following the start at block 201, block 202 corresponds to the acquisition of new frame data and the setting of the index i to 1. Block 202 leads to block 214 which calculates the local average $A_i$ of a frame portion corresponding to signals $V_i$. Block 214 leads to block 218 which calculates $B_i$ for each pixel in a frame portion $P_i$. If there were 64 pixels in a frame portion $P_i$, there would then be 64 different values of $B_i$, each value corresponding to a particular pixel. Block 218 leads to block 220 which performs the forward process on the values of $B_i$ to generate a corresponding number of values for $C_i$. In particular, block 220 performs the function corresponding to the transfer curve of FIG. 3. Block 220 leads to block 222 which calculates the offset $S_i$ for a frame portion $P_i$. In other words, there is only one offset value for each frame portion $P_i$. Block 222 leads to block 226 where one value of $D_i$ for each pixel is calculated. Block 230 follows block 226 and calculates one value of $E_i$ for each pixel in the particular frame portion $P_i$. Following block 230, block 203 determines whether the frame portion is the last frame portion in a frame. If not, control transfers to block 204 which increments the value of i and leads to block 214 to repeat the process upon a new frame portion. If block 203 determines that the process has been performed upon the last frame portion within a particular frame, control is transferred to block 205 which stores or transmits the frame (applies video frame to storage or transmission medium.) Additionally block 205 tests to determine if the frame is the last frame. If not, control transfers back to block 202 to repeat the process on the next frame. If the last frame is reached, block 205 transfers control to block 206 which stops the process.

Figure 10:
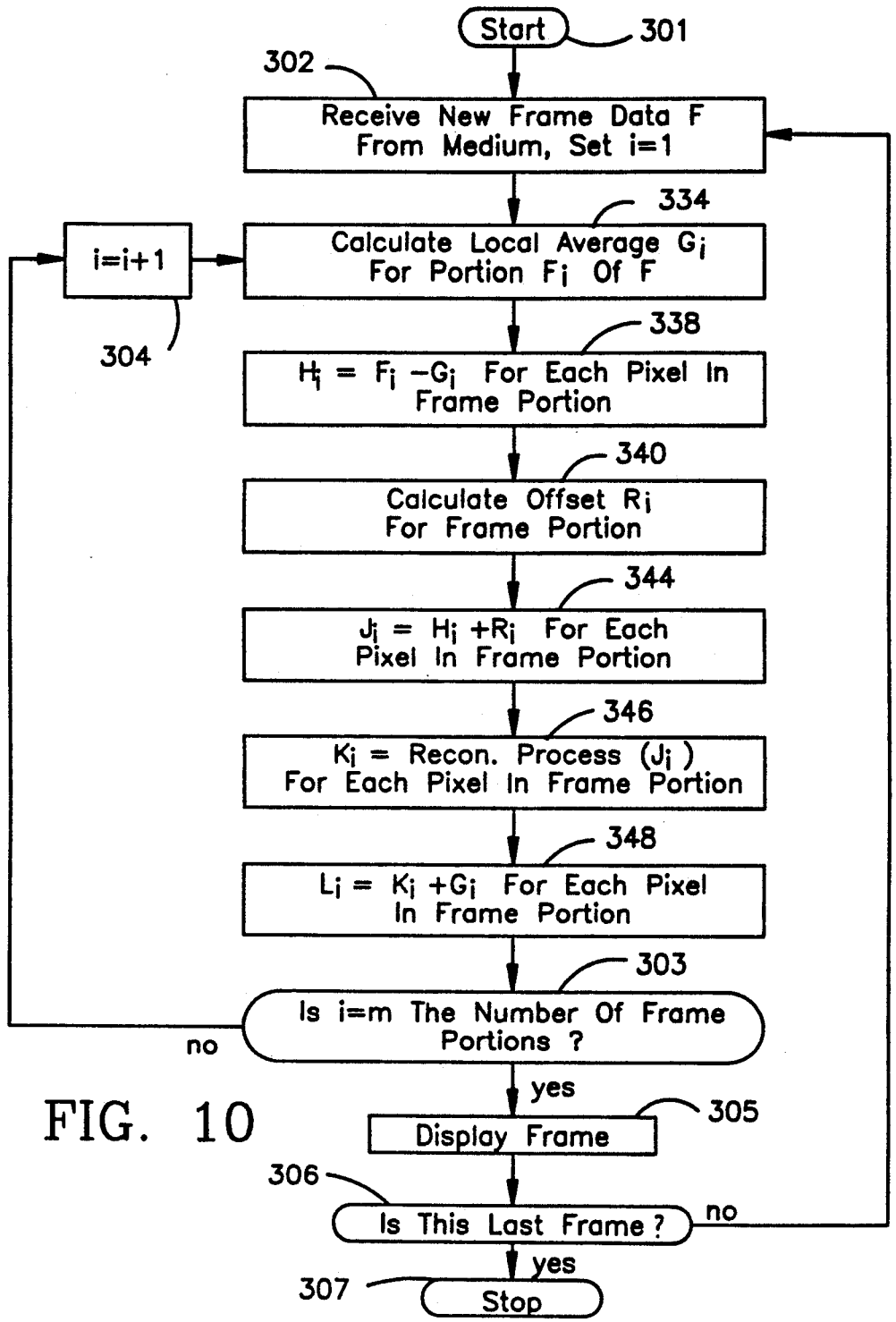
FIG. 10 is a simplified flowchart illustrating the steps of the decoding process of FIG. 2.

Turning now to FIG. 10, a flowchart corresponding to the decoding arrangement of FIG. 2 will be discussed. The blocks within the flowchart of FIG. 10 have been labeled in the "300" series with the same last two digits as any corresponding block of FIG. 2. Start 301 leads to block 302 which receives the new frame data and sets the index i equal to 1. Block 302 leads to block 334 which calculates the local average $G_i$ corresponding to a particular portion of the new frame. Block 334 leads to block 338 which calculates $H_i$ for each pixel in the frame portion by subtracting the local average $G_i$. Block 338 leads to block 340 which calculates the offset $R_i$ for a particular frame portion. Following block 340, block 344 adds the offset to $H_i$, the sum being $J_i$. There is a corresponding value of $J_i$ for each pixel in the particular frame portion. Block 344 leads to block 346 which applies the reconstruction function or process corresponding to FIG. 4 to generate $K_i$. Block 346 then leads to block 348 which calculates $L_i$ by adding $K_i$ and $G_i$ for each pixel in the frame portion. Block 348 leads to block 303 which determines whether the last frame portion in a particular frame has been processed. If not, block 303 returns to block 334 by way of block 304 which increments the index i. If the last frame portion in a particular frame has been processed, control is transferred to block 305 which displays the frame (or alternately stores it in a computer memory, records it on video tape, distributes it to local receivers, etc.). Block 305 leads to block 306 which determines if the last frame has been reached. If not, control transfers to block 302 such that the process may be repeated for a new frame. Upon reaching the last frame, block 306 transfer control to block 307 which stops the process.

Attached as an Appendix is a computer program which can be used to implement the invention in accord with the simplified flowcharts of FIGS. 9 and 10.

The encoding process and the decoding process of the present invention are especially well adapted to be used in combination with certain other video processing techniques. Before describing how the present invention may be useful with such techniques, some of those techniques will be discussed.

For individual single images which are to be compressed so as to require a smaller quantity of data for transmission or storage, an image is passed to an image compression process such as a predictive coder, a transform coder, or a vector quantization coder. Often the Discrete Cosine Transform is used, although other transforms may be used. The coefficients which are the output of the transform process are then subjected to a quantization process which groups multiple different, but numerically close, values together as a single value. A smaller set of different values then exist which requires a smaller number of different code words to be used in a digital communication or storage system. Further compression is usually possible by employing entropy coding of the quantized values. This latter technique is usually implemented by Huffman coding. Quantization can be effectively used on the transform coefficients to a greater degree than on the actual pixel values themselves as less visible distortion is created by performing the quantization operation on the coefficients. The use of a transform also tends to compact the energy of a group of pixels taken together into a small group of non-zero value coefficients. Even greater efficiency may be gained by also employing run-length coding between non-zero value coefficients issuing from the transformer. These are techniques which are used in practical video compression systems.

The technique of vector quantization of images can be viewed as a specially tailored set of transform basis functions and is also used for video compression.

The quantization process employed on transform coefficients distorts a reconstructed image by affecting the amplitude of most all of the pixels covered by the coefficient. The relationship between adjacent pixels is usually not significantly affected by coefficient quantization, although the amplitudes of several pixels in the same small area of the image may be increased or decreased together by the quantization. This quantization distortion is considerably less visible when the quantization is employed on transform coefficients instead of using independent quantization of each pixel.

Quantization tends to introduce an amount of image distortion in proportion to the amount of the quantization employed. In addition, however, quantization used to a considerable extent tends to wash-out low contrast image areas. This occurs when some low amplitude coefficients become zero amplitude coefficients due to the quantization process.

There are two well known techniques for combating or overcoming the distortion problems encountered with the use of quantization. The first is adaptive quantization where measurements are first taken to determine the contrast of a local area of an image and then the amount of quantization to be used is determined based on this local contrast. This technique is superior to that of using the same quantization for the entire image since the human visual system will have greater sensitivity in the lower contrast areas than in the higher contrast areas (the previously discussed spatial masking effect).

Where a high contrast range is encountered, the step size of quantization will be made greater to accommodate the larger range of coefficients in the high contrast image area such that a relatively small number of quantized values will be required to handle the image area. In a low contrast area, the quantization steps will be closer together, but the input range of coefficients generally required will not be as great as a high contrast area such that a relatively small number will be required.

There are two difficulties with this type of adaptive quantization and the present invention is especially well-suited for overcoming or minimizing these difficulties. The first difficulty is the need to perform an assessment of the local contrast prior to setting the step size for coefficient quantization to be used. The second difficulty is the inherent limitation of a technique operating in the coefficient, rather than pixel, domain in that the effects of the adaptive technique are applied over all the pixels included in that transform process. Therefore, the adaptive quantization step size affects all the reconstructed pixels including those in both lower and higher contrast areas of the same region. Thus, an area containing both higher and lower contrast image portions is treated as a single contrast type.

In a first type of adaptive quantization, the quantization steps are uniformly spaced in amplitude with the possible exception of the first step nearest zero. However, a second adaptive quantization technique does not use uniform quantization, but rather quantization which is a function of each coefficient amplitude. The second technique is based on the idea that, if a low contrast image area is being processed, the quantization step size will automatically be low to differentiate and preserve low amplitude coefficients without serious distortion being caused in the reconstructed image. If the image is one of high contrast, then higher amplitude transform coefficients will be more coarsely quantized, which will not result in perceived image distortion due to spatial masking. An advantage of this technique over the previous adaptive quantization technique is that a contrast evaluation need not necessarily be made prior to transform coding. Where an image section contains both high and low contrast areas however, all portions of the area will be treated alike by the non-uniform quantization method.

An example of high and low contrast areas coexisting in an area of pixels which are used in a transform process is that of hand or type writing where dark narrow lines appear on a uniformly light background. The effect of transform processing will be several modest to medium amplitude coefficients. The darker and the wider the lines are, the higher the coefficient values will be. In the reconstruction, the uniformly light portion of the image must be formed by accurate cancellation of the various sinusoids (or more generally basis functions) whose amplitudes are the transform coefficient values. With quantization of the coefficient amplitudes, the exact cancellation is upset and the light image portion takes on a non-uniform intensity. Upon reconstructing this is noticeable as distortion to the eye when the quantization step size exceeds a certain value. However, the imprecise reconstructed intensity of the lines in the image due to coefficient quantization is of little consequence to the eye due to spatial masking.

The companding technique of the present invention (encoding process of FIG. 1 and decoding process of FIG. 2) expands the amplitude range about the average value of all the pixels in a block area for intensity values near the average value and compresses those which are further away from the average. The average value for the above example just discussed would be somewhere in between the dark line intensity and the intensity of the light background portion. Assuming that the percentage of area of the dark lines is small relative to the area of the uniform light area, the block average value will be closer to the light intensity and further from the dark lines. Thus, the amplitude of the uniform area will be expanded by companding and the amplitude of the dark lines will be compressed.

When the companded image is transformed and subjected to coefficient quantization, the reconstructed image before inverse companding will contain quantization distortion of the type discussed above. However, those errors occurring in the uniformly light portion of the image will be attenuated by the inverse companding process which restores the image to its non-companded form. This occurs because the slope of the inverse companding curve in the intensity vicinity of the block average value is quite low. The uniform light area will appear to be more uniform than if no companding were used or if some adaptive quantization in the coefficient domain was used. The intensity of the dark line may be further distorted by the companding process, but it is still difficult to perceive due to the spatial masking of dark lines against a light background.

Thus, the process of video companding of the present invention has the effect of minimizing the perceived video distortion and low contrast wash-out introduced by the quantization of transform coefficients. Compared with the previous adaptive techniques operating in the coefficient domain, the companding technique requires no contrast analysis prior to the processes of image compression and quantization and importantly accommodates image areas containing both low and high contrast imagery.

Turning now to FIG. 11, a simplified block diagram shows how the present invention may be used in combination with known image compression and quantization techniques. In FIGS. 11 and 12, the transform method of image compression is shown as being used, although predictive coding or vector quantization could alternately be used. A video signal is supplied to an encode process 400, which corresponds to the encoding technique of FIG. 1, the encode part of FIG. 8, and/or the encoding steps of FIG. 9. The output from the encode process 400 would be E corresponding to the encoder output of FIG. 1 for example. That output is, instead of being applied directly to a medium 402, applied to the medium 402 after transformation in block 404 and quantization in block 406. The transform 404 may be a discrete cosine transform or of some other type.

The coefficients applied to the medium at block 402 (stored in a storage medium or transmitted in a transmission medium) are recovered beginning at block 408 which performs inverse quantization. After block 408, block 410 performs the inverse transform. The output of the inverse transform will correspond to signal F in FIG. 2 and will be supplied to the decode process 412. The decode process 412 corresponds to the decoding process of FIG. 2, the decoding part of FIG. 8, and/or the decoding steps of FIG. 10. The specifics of blocks 402 through 410 may be of various known types and need not be described in detail.

The present invention is further especially well-suited for providing distortion reduction and minimization of low contrast wash-out when motion compensation techniques are used. However, an additional benefit of using the present invention is provided when the present invention is used in a motion compensated prediction process which occurs at both transmitter and receiver wherein only the errors (differences between the predicted image and the actual input image) and motion vectors are transmitted from transmitter to receiver when operated in its inter-frame mode. This inter-frame compression method is employed in the motion compensated discrete transform coded compression process of recommendation H.261 of the International Telegraph and Telephone Consultive Committee. This standard is now being used for compression of video for video teleconferencing to achieve low transmission costs.

Turning now to FIG. 12, a technique for using the present invention in combination with previously used motion compensation techniques will be discussed. The numbers of the blocks in FIG. 12 are in the "500" series with the same last two digits as the corresponding component, if any, of FIG. 11. Thus, encode process 500 transform 504, quantization 506 correspond respectively to components 400, 404, and 406 of FIG. 11. Since there are two blocks in FIG. 12 which correspond, individually, to each of the blocks 408, 410, and 412 of FIG. 11, the blocks at the forward stage of FIG. 12 corresponding to those blocks will be labeled with an F suffix, whereas the blocks at the recover or receive stage of the process will be labeled with a suffix of R.

Before discussing the operation of the arrangement of FIG. 12 for inter-frame compression, its intra-frame operation in situations of very rapid and complex changes between images will be discussed. It is noted that three switches 514, 516, and 518 are included in this arrangement. During rapid and complex changes between images, the switches will be in their upper or A position. Accordingly, the video signal supplied at the left of the FIG. 12 arrangement will be supplied directly to process 500 by way of switch 514. The process 500, transform 504, quantization 506, application to the medium and recovery from the medium at block 502, inverse quantization at block 508R, inverse transform at block 510R, and decode process 512R will operate in the same fashion as discussed with respect to FIG. 11. The output from the decode process 512R passes to a summer 520 and considering that the summer 520 simply adds zero to that output when switch 518 is in its upper or A position, the output of block 512R is supplied to a picture memory 522. In this case no motion vectors are transmitted or received. The picture memory 522 may be accessed to provide the video signal out. The picture memory 522 may be realized by the type of alternate dual memory arrangements as shown in the top portion of FIG. 5.

When a motion image sequence involves relatively simple motion, then it is often possible to find an image block from a previous frame already stored locally by the decoder and which is a good match for a block in the current image or video frame. The block from the previous video frame or image which matches a block or video image portion of the current frame may be in a slightly different location due to image motion. In the case of such relatively simple motion, the switches 514, 516, and 518 will be in their lower or B positions as illustrated in FIG. 12. Accordingly, inter-frame compression or motion compensation will take place as follows.

The video signal is supplied to a summer 524. A picture memory 526 contains the previous image and is addressed using motion vectors in such a way as to compensate for motion which has occurred between the previous and current images. The means for determination of the motion vectors is not shown in FIG. 12 or discussed herein, but known structures could be used. Accordingly, the picture memory 526 provides the summer 524 with a reference image portion by way of loop filter 528. The loop filter 528 is an optional two-dimensional low-pass filtering operation which aids in reducing motion compensation introduced artifacts. The summer or subtractor 524 subtracts the previous reference image portion from the current image on a picture element by picture element basis and the resulting difference image is passed through switch 514 to the encode process 500 for processing as described previously. However, the quantized coefficients in this case result from the difference image rather than from the image itself as in the intra-frame situation.

The difference coefficients which have been applied to the medium at block 502 and recovered from the medium are processed through blocks 508R, 510R, and 512R. The output of block 512R is now a signal representing the difference of a picture element in this frame from a picture element in a previous frame. In order to recover the actual signal, the corresponding picture element from the previous frame is addressed in picture memory 522, using motion vectors, and supplied to the summer 520 by way of loop filter 530 and switch 518 now in its B position. Accordingly, the output from summer 520 is fed into picture memory 522 and now represents the recovered image, which may be read out.

It should be noted that the use of the motion vectors and the general principles of inter-frame compression are known. However, the arrangement of FIG. 12 represents a significant improvement of those techniques by using them in combination with the encode process 500 and decode process corresponding to blocks 512F and 512R in accord with the present invention.

When using motion compensation, a problem may develop upon such rapid image change that inter-frame compression is temporarily stopped (switches of FIG. 12 in the A positions). The quantization may become so coarse in order to keep up with the bit rate (limit on transmission capacity) that distortion may occur. The present video companding invention provides pixel amplitude redistribution to take advantage of spatial masking by encode process 500 which helps to avoid or minimize distortion even when excessively high quantization step size must be used to limit the generation of output data.

Although the present techniques are useful for conveying a sequence of video images, it is to be understood that the present invention has applicability to the storage or transmission of a single image or video frame. Moreover, it is to be understood that the present application is using the term video to indicate an image. Thus, an image as used in a machine not normally associated with video device would be considered a video frame as used herein.

Although various specific constructions and arrangements have been discussed herein, it is to be understood that these are for illustrative purposes only. Various modifications and adaptations will be apparent to those of skill in the art. Accordingly, the scope of the present invention should be determined by reference to the claims appended hereto.

APPENDIX

```
REM   Video Companding Simulation
      'This computer program written in Borland TurboBasic
      'Each frame portion is 8*8 input pixels. There are 64 frame portions.
      'Random number data between 0 and 255 is generated as input pixel
      'data, V. There are 4096 picture elements in this synthetic picture.
      'The processes of forward and reconstruction companding are
      'performed and the reconstructed data L is compared with V at the end
      'when the program is run. The computer program line numbers
      'correspond to the reference numbers in Figures 9 and 10.
      'DIM V(4096),E(4096),L(4096),B(64),C(64),D(64)
      'DIM H(6,4),J(64),K(64):DEFINT N,M,P,Q,W
      N1=512' N1= Pixels per row
      N3=8*N1' N3= Pixels per strip
      N1T=N1-1:N3T=N3-1
      FOR I=0 TO N3T:V(I)=255*RND:NEXT I' Load in random number pixel data
      ' Forward Companding * * * * * * * * * * * * * * * * * * * * * * *
      C=7:C0=255:C1=LOG(1+C)' C= Companding parameter; C0=positive input range
      FOR I=1 TO 64:P0=8*(I-1)
        X=0
        FOR Q=0 TO 7:P1=P0+Q*N1
          FOR W=0 TO 7
            X=X+V(P1+W)'                        ** Accumulate X to find Block Average
          NEXT W
        NEXT Q:A=X/64'                          ** Normalize and store the Block Average
        FOR Q=0 TO 7:P1=P0+Q*N1
          FOR W=0 TO 7
            B(8*Q+W)=V(P1+W)-A'                 ** Remove Block Average from each pixel
          NEXT W
        NEXT Q
        FOR Q=0 to 7'                                           ** Compand all elements
          FOR W=0 TO 7
            X3=B(8*Q+W):W1=SGN(X3):X3=X3*W1'    ** Remove sign of B(8*K+I)
            X3=(C0/C1)*LOG(1+C*X3/C0)'                          ** Compand the pixel
            C(8*Q+W)=W1*X3'                     ** Replace pixel sign & store
          NEXT W
        NEXT Q
        X=0
        FOR Q=0 TO 7
          FOR W=0 TO 7
            X=X+C(8*Q+W)'                       ** Accumulate X to find Offset Average
          NEXT W
        NEXT Q:S=X/64'                                          ** Save Offset Average
        FOR Q=0 to 7'                           ** Subtract offset average from all pixels
          FOR W=0 TO 7
            D(8*Q+W)=C(8*Q+W)-S'                ** Subtract the Offset average
          NEXT W
        NEXT Q
        FOR Q=0 to 7:P1=P0+Q*N1'                ** Add the Block Average to each pixel
          FOR W=0 TO 7
            E(P1+W)=D(8*Q+W)+A'                 Add Block Average back in to each pixel
          NEXT W
        NEXT Q
      NEXT I:PRINT "FORWARD DONE"
      'Pixels in E(*) Array (only) are sent to and used at the decoder
      'as the Data "F"
      ' Reconstruction Companding * * * * * * * * * * * * * * * * *
      FOR I=1 TO 64:P0=8*(I-1):X=0
        FOR Q=0 TO 7:P1=P0+Q*N1
          FOR W=0 TO 7
            X=X+E(P1+W)'                        ** Accumulate X to find Local Average
          NEXT W
        NEXT Q:G=X/64'                          ** Normalize the Local Average, G
        FOR Q=0 TO 7:P1=P0+Q*N1
          FOR W=0 TO 7
            H(8*Q+W)=E(P1+W)-G'                 ** Remove Local Average
          NEXT W
        NEXT Q
        X6=:0X7=0:X8=0
        FOR Q=0 TO 7
          FOR W=0 TO 7
            X9=H(8*Q+W):W1=SGN(X9):X9=X9*W1'            ** Remove sign of H(*)
            X6=X6+(C0/C)*W1*(EXP(C1*X9/C0)-1)'Inv. compand accumulation
            X7=X7+(C1/C)*(EXP(C1*X9/C0))'                       ** Inv. 1st derivitive
            X8=X8+W1*(C1/C0)*(C1/C)*(EXP(C1*X9/C0))'Inv. 2nd derivitive
            'Note: sign is replaced on only X6 and X8;
            '      X7 is always positive
          NEXT W
        NEXT Q
        K2=X6/X7:K1=X8/(2*X7)
        R=-K2*(1-K1*K2*(1-2*K1*K2))'                            ** Offset computed
        FOR Q=0 TO 7
```

APPENDIX -continued

```
    FOR W=0 TO 7
        J(8*Q+W)=H(8*Q+W)+R'                ** Add in the Offset
    NEXT W
NEXT Q
FOR Q=0 TO 7
    FOR W=0 TO 7
        X4=J(8*Q+W):W2=SGN(X4):X4=X4*W2
        K(8*Q+W)=W2*(CO/C)*(EXP(C1*X4/CO)-1)'   ** Inverse Compand
    NEXT W
NEXT Q
FOR Q=0 TO 7:P1=P0+Q*N1
    FOR W=0 TO 7
        L(P1+W)=K(8*Q+W)+G'      Add local average back in to get pixel
    NEXT W
NEXT Q
NEXT I:PRINT "RECONSTRUCTION DONE"
FOR N=0 TO N3T
    PRINT N,
    PRINT USING "####.## ";L(N);V(N);'**   Print and compare input
    PRINT USING "##.######";L(N)-V(N)'   ** and output pixels
NEXT N
?"END":END
```

What is claimed is:

1. A method in a signal processing system for processing of video data comprising performing a forward encode process of the steps of:

calculating a local average $A_i$ of a portion $V_i$ of a video input V, which portion corresponds to a portion $P_i$ of a video frame;

subtracting said local average $A_i$ from at least part of said portion $V_i$ to generate a signal $B_i$;

subjecting said signal $B_i$ to a non-linear forward process to generate a signal $C_i$ which emphasizes any values of $B_i$ which correspond to any values of $V_i$ having relatively small differences from the local average $A_i$ and which de-emphasizes any values of $B_i$ which correspond to any values of $V_i$ having relatively large differences from the local average $A_i$;

using said signal $C_i$ to provide and apply an encoded output $E_i$ to a medium; and repeating the above steps for i running at least from 1 to m where m is an integer larger than 1 and is the number of portions of the video frame for which the local average $A_i$ is calculated; and such that said encoded output $E_i$ is recoverable from said medium to reconstruct the video frame with relatively low contrast parts of the video frame having an increased signal-to-noise ratio, the increased signal-to-noise ratio for a particular low contrast part being increased relative to a signal-to-noise ratio for that low contrast part in the absence of the forward encode process, and relatively high contrast parts of the video frame having a decreased signal-to-noise ratio, the decrease signal-to-noise ratio for a particular high contrast part being decreased relative to a signal-to-noise ratio for that high contrast part in the absence of the forward encode process.

2. The method of claim 1 wherein, for i running from 1 to m, the using of said signal $C_i$ to provide the encoded output $E_i$ comprises substeps of:

calculating an offset $S_i$ as a local average of said signal $C_i$; and subtracting the offset $S_i$ from said signal $C_i$ to provide a signal $D_i$; and providing the encoded output $E_i$ from said signal $D_i$.

3. The method of claim 2 wherein, for i running from 1 to m, the encoded output $E_i$ is provided from said signal $D_i$ by adding said local average $A_i$ to said signal $D_i$ to generate said encoded output $E_i$.

4. The method of claim 2 wherein, for each i from 1 to m, each of video input portions $V_i$, said encoded output $E_i$, and said signals $B_i$, $C_i$, and $D_i$ is a set of digital samples corresponding to values at different pixels in said portion $P_i$.

5. The method of claim 1 wherein, for i running from 1 to m, the using of said signal $C_i$ to provide the encoded output $E_i$ comprises substeps of:

calculating an offset $S_i$ as a local average of said signal $C_i$; and generating the encoded output $E_i$ from said $C_i$ by subtracting the offset $S_i$ and adding said local average $A_i$ and wherein the subtracting of the local average $A_i$ involves subtracting said local average $A_i$ from all values of $V_i$.

6. The method of claim 5 wherein m is greater than 25 and the method is performed in a signal processing system which is a digital data processing system.

7. The method of claim 5 wherein each portion $P_i$ is a block having a width of a plurality of pixels and a height of a plurality of lines.

8. The method of claim 5 further comprising the step of applying said offsets $S_i$ to the medium.

9. The method of claim 5 wherein said medium is a storage medium.

10. The method of claim 5 wherein said medium is a transmission medium.

11. The method of claim 5 further comprising performing a decode process inverse to the forward encode process, for i running from 1 to m, by the steps of:

recovering a signal $F_i$ from said medium, said signal $F_i$ corresponding to said encoded output $E_i$ as altered by noise and/or distortion from transmission or storage;

using said signal $F_i$ and a non-linear reconstruction process to generate a signal $L_i$, which said signal $L_i$ corresponds to said signal $V_i$ as altered by noise and/or distortion, said non-linear reconstruction process having an inverse transfer characteristic as said non-linear forward process; and supplying said signal $L_i$ to a video monitor to display the video frame with an increased signal-to-noise ratio in relatively low contrast parts of the video frame and a decreased signal-to-noise ratio in relatively high contrast parts of the video frame.

12. The method of claim 11 wherein the using of said signal $F_i$ and the non-linear reconstruction process includes, for i running from 1 to m, the substeps of:

calculating a local average $G_i$ of said signal $F_i$; subtracting said local average $G_i$ from said signal $H_i$ to generate a signal $H_i$;

adding an offset $R_i$ to said signal $H_i$ to generate a signal $J_i$;

applying said non-linear reconstruction process to said signal $J_i$ to generate a signal $K_i$; and adding said local average $G_i$ to said signal $K_i$, the sum of said local average $G_i$ and signal $K_i$ being said signal $L_i$.

13. The method of claim 1 wherein said encoded output $E_i$ is subjected to video data compression encoding prior to its application to said medium.

14. The method of claim 13 wherein said video data compression encoding includes transform coding and quantization.

15. The method of claim 13 wherein said video data compression encoding includes predictive coding.

16. The method of claim 13 wherein said video data compression encoding includes vector quantization.

17. The method of claim 13 further comprising the step of motion compensating by having at least part of the video input V being the result of subtracting a video signal corresponding to a previous frame from a video signal corresponding to a current video frame.

18. A method in a signal processing system for processing of video data comprising performing a decode process, for i running from 1 to m where m is an integer larger than 1 and corresponds to a number of portions of a video frame by the steps of:

recovering a signal $F_i$ from a medium, signal $F_i$ corresponding to a signal $E_i$ as altered by noise and/or distortion, if any, which said signal $E_i$ was previously applied to the medium after performing a forward encode process and corresponds to a portion $P_i$ of a video frame, the decoder process being the inverse of the forward encode process;

subtracting a local average $G_i$ of said signal $F_i$ from said signal $F_i$ to generate a signal $H_i$;

adding an offset $R_i$ to said signal $H_i$ to generate a signal $J_i$;

applying a non-linear reconstruction process to said signal $J_i$ to generate a signal $K_i$, said non-linear reconstruction process being monotonic and having a transfer curve with a relatively lower slope around the origin and a relatively higher slope further away from the origin.

adding said local average $G_i$ to said signal $K_i$, the sum of said local average $G_i$ and said signal $K_i$ being signal $L_i$; and supplying said signal $L_i$ to a video monitor to display a video frame with relatively low contrast parts of the video frame having an increased signal-to-noise ratio, the increased signal-to-noise ratio for a particular low contrast part being increased relative to a signal-to-noise ratio for that low contrast part in the absence of the forward encode process, and relatively high contrast parts of the video frame having a decreased signal-to-noise ratio, the decreased signal-to-noise ratio for a particular high contrast part being decreased relative to a signal-to-noise ratio for that high contrast part in the absence of the forward encode process.

19. The method of claim 18 wherein said signal $F_i$ is recovered by performing an inverse quantization on coefficients from said medium and performing an inverse transformation on the results of the inverse quantization.

20. The method of claim 19 further comprising the step of motion compensating by reconstructing a current video frame by adding a video signal corresponding to a prior video frame to a video signal corresponding to the current video frame.

21. A signal processing system for processing of video data comprising means for performing a forward encode process including:

means for calculating a local average $A_i$ of a portion $V_i$ of a video input V, which portion corresponds to a portion $P_i$ of a video frame, for i running from 1 to m where m is an integer larger than 1 and is the number of portions $P_i$ of the video frame for which the local average $A_i$ is calculated;

means, connected to said means for calculating, for subtracting said local average $A_i$ from $V_i$ to generate a signal $B_i$;

means, connected to said means for calculating, for applying a non-linear forward process to generate a signal $C_i$ which emphasizes any values of $B_i$ corresponding to any values of $V_i$ having relatively small differences from the local average $A_i$ and which de-emphasizes any values of $B_i$ corresponding to any values of $V_i$ having relatively large differences from the local average $A_i$; and means, connected to said means for applying, for using said signal $C_i$ to provide and apply an encoded output $E_i$ to a medium such that said encoded output $E_i$ is recoverable from said medium to reconstruct the video frame with relatively low contrast parts of the video frame having an increased signal-to-noise ratio, the increased signal-to-noise ratio for a particular low contrast part being increased relative to a signal-to-noise ratio for that low contrast part in the absence of the forward encode process, and relatively high contrast parts of the video frame having a decreased signal-to-noise ratio, the decreased signal-to-noise ratio for a particular high contrast part being decreased relative to a signal-to-noise ratio for that high contrast part in the absence of the forward encode process.

22. The system of claim 21 wherein said signal processing system is a digital data processing system and said means to apply the non-linear forward process is a memory having a look-up table stored therein.

23. The system of claim 22 wherein said means for using said signal $C_i$ includes:

means to calculate an offset $S_i$ as a local average of said signal $C_i$; and means to generate said encoded output $E_i$ from said signal $C_i$ by subtracting the offset $S_i$ and adding said local average $A_i$.

24. The system of claim 23 wherein, for each i from 1 to m, each of video input portions $V_i$, said encoded output $E_i$, and said signals $B_i$ and $C_i$ is a set of digital samples corresponding to values at different pixels in said portion $P_i$ and wherein each of said portions $P_i$ is a block having a width of a plurality of pixels and a height of a plurality of lines.

25. The system of claim 21 wherein said means for using said signal $C_i$ includes means to apply video data compression encoding to $E_i$ prior to its application to said medium.

26. The system of claim 25 further comprising means for motion compensation including means to generate the video input V by subtracting a video signal corresponding to a previous frame from a video signal corresponding to a current video frame.

27. A signal processing system for processing of video data comprising means for performing a decode process including:

means for recovering a signal $F_i$ from a medium, from i running from 1 to m where m corresponds to a number of portions of a video frame said signal $F_i$ corresponding to a signal $E_i$ as altered by noise and/or distortion, which said signal $E_i$ was previously applied to the medium after performing a forward encode process and corresponds to a portion $P_i$ of a video frame, the decode process being the inverse of the forward encode process;

means for subtracting a local average $G_i$ of said signal $F_i$ from said signal $F_i$ to general a signal $H_i$;

means for adding an offset $R_i$ to said signal $H_i$ to generate a signal $J_i$;

means, connected to said means for recovering, for applying a non-linear reconstruction process to said signal $J_i$ to generate a signal $K_i$, said non-linear reconstruction process being monotonic and having a transfer curve with a relatively lower slope around the origin and a relatively higher slope further away from the origin;

means, connected to said means for applying, for adding said local average $G_i$ to said signal $K_i$, the sum of said local average $G_i$ and said signal $K_i$ being signal $L_i$; and means, connected to said means for adding, for supplying said signal $L_i$ to a video monitor to display a video frame with relatively low contrast parts of the video frame having an increased signal-to-noise ratio, the increased signal-to-noise ratio for a particular low contrast part being increased relative to a signal-to-noise ratio for that low contrast part in the absence of the forward encode process, and relatively high contrast parts of the video frame having a decreased signal-to-noise ratio, the decreased signal-to-noise ratio for a particular high contrast part being decreased relative to a signal-to-noise ratio for that high contrast part in the absence of the forward encode process.

28. The system of claim 27 wherein said means for recovering includes means for performing an inverse quantization on coefficients from said medium and means for performing an inverse transformation on the results of the inverse quantization.

29. The system of claim 28 further comprising means for motion compensation including means for reconstructing a current video frame by adding a video signal corresponding to a prior video frame to a video signal corresponding to the current video frame.

* * * * *

UNITED STATES PATENT AND TRADEMARK OFFICE
CERTIFICATE OF CORRECTION

PATENT NO. : 5,313,298
DATED : May 17, 1994
INVENTOR(S) : G. William Meeker

It is certified that error appears in the above-identified patent and that said Letters Patent is hereby corrected as shown below:

Claim 1, (line 32), column 27, line 55, change "decrease" to -- decreased --;

Claim 5, (line 6), column 28, line 36, after "said" insert -- signal --;

Claim 12, (line 5), column 29, line 7, change "$H_i$" to -- $F_i$ --;

Claim 18, (line 6), column 29, line 36, after "medium" insert -- said --;

Claim 20, (line 2), column 30, line 7, change "compensating" to

-- compensation --;

Claim 27, (line 4), column 31, line 11, change "from" to -- for --;

Claim 27, (line 6), column 31, line 13, after "frame" insert -- , --;

Claim 27, (line 14), column 31, line 21, change "general" to -- generate --.

Signed and Sealed this

Sixteenth Day of August, 1994

Attest:

BRUCE LEHMAN

Attesting Officer

Commissioner of Patents and Trademarks